United States Patent
Hwang et al.

(10) Patent No.: US 8,599,665 B2
(45) Date of Patent: Dec. 3, 2013

(54) INFORMATION STORAGE MEDIUM, RECORD REPRODUCTION APPARATUS, AND RECORD REPRODUCTION METHOD

(75) Inventors: Sung-Hee Hwang, Suwon-si (KR); Jung-Wan Ko, Suwon-si (KR); Kyung-Geun Lee, Seongnam-si (KR); In-Oh Hwang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/217,451

(22) Filed: Aug. 25, 2011

(65) Prior Publication Data

US 2011/0305126 A1 Dec. 15, 2011

Related U.S. Application Data

(63) Continuation of application No. PCT/KR2010/001175, filed on Feb. 25, 2010.

(30) Foreign Application Priority Data

| Feb. 25, 2009 | (KR) | .......................... 10-2009-0015956 |
| Feb. 26, 2009 | (KR) | .......................... 10-2009-0016551 |
| Feb. 24, 2010 | (KR) | .......................... 10-2010-0016666 |

(51) Int. Cl.
  *G11B 7/00* (2006.01)
(52) U.S. Cl.
  USPC .................. 369/53.15; 369/53.17; 369/59.25; 369/94
(58) Field of Classification Search
  USPC .......... 369/47.14, 53.13, 53.15, 53.17, 59.25, 369/283, 94
  See application file for complete search history.

(56) References Cited

U.S. PATENT DOCUMENTS

| 7,203,139 | B2* | 4/2007 | Terada et al. ............... 369/47.14 |
| 7,203,153 | B2* | 4/2007 | Kuraoka et al. ............ 369/275.3 |
| 2005/0030849 | A1* | 2/2005 | Park .......................... 369/47.14 |
| 2005/0047294 | A1* | 3/2005 | Park .......................... 369/47.14 |
| 2005/0141400 | A1* | 6/2005 | Hwang et al. .............. 369/275.3 |
| 2006/0098558 | A1 | 5/2006 | Kobayashi et al. |
| 2006/0203684 | A1* | 9/2006 | Ko et al. ........................ 369/100 |
| 2007/0153650 | A1* | 7/2007 | Yoshida et al. ............ 369/47.14 |
| 2008/0019244 | A1* | 1/2008 | Park et al. .................. 369/47.14 |

FOREIGN PATENT DOCUMENTS

| EP | 2-003-646 A1 | 12/2008 |
| EP | 2-341-500 A1 | 7/2011 |
| EP | 2-398-018 A2 | 12/2011 |
| KR | 10-2005-0015381 | 2/2005 |

(Continued)

OTHER PUBLICATIONS

Blue-ray Disc (BD) Multi-Media Command Set Description, Version 1.0, Mar. 16, 2006 (183 pages, in English).

(Continued)

*Primary Examiner* — Thomas Alunkal
(74) *Attorney, Agent, or Firm* — NSIP Law

(57) ABSTRACT

Provided is an information storage medium that has a plurality of recording layers, a recording/reproducing method, and a recording/reproducing apparatus. In the information storage medium, each of the plurality of recording layers includes an inner circumference zone and a data zone, and at least one of the recording layers includes, in the inner circumference zone, a temporary disc management area (TDMA) for recording information about a defect detected in the data zone, wherein a size of a TDMA allocated on an upper layer is greater than a size of a TDMA allocated on a lower layer.

10 Claims, 26 Drawing Sheets

(56) References Cited

FOREIGN PATENT DOCUMENTS

| | | |
|---|---|---|
| KR | 10-2007-0046163 | 5/2007 |
| WO | WO 2004/029964 A1 | 4/2004 |
| WO | WO 2008/007898 A1 | 1/2008 |

OTHER PUBLICATIONS

European Search Report issued Nov. 5, 2012 in counterpart European Patent Application No. 10746431.5-1247 (8 pages, in English).

* cited by examiner

FIG. 4

| | L0 | L1 | L2 | L3 |
|---|---|---|---|---|
| Start 21.0 | | | | |
| Radius 22.2 | BCA(L0):Wide pitch Grooves | | | |
| Radius 22.512 | Protection zone1: HFM Grooves | Protection zone1:Wobbled Grooves | | |
| | PIC:HFM Grooves 2720*4KB, TP 0.35  231 | Reserved  223 | | OPC3(2048)  204 |
| | Protection zone2 | | Buffer zone2(1024)  213 | Reserved |
| | Reserved  221 | Reserved  222 | OPC2(2048)  203 | |
| | | | Buffer zone1(1024)  212 | Reserved |
| | OPC0(2048)  201 | OPC1(2048)  202 | Reserved  211 | |
| | | Buffer zone0(1024)  242 | | |
| | TDMA0(2048)  241 | TDMA1(2048)  242 | TDMA2(2048)  243 | TDMA3(2048)  244 |
| | INFO2:256 Cls. (Reserved, PAC2, DMA2, Control data2 Buffer2) | | | |
| | Reserved | | | Reserved |
| | INFO1:256 Cls. (Pre-write area, Drive area, DMA1, Control data1, PAC1) | | | |
| 32GB:Data Zone 24.200 | | | | |
| 32GB:Data Zone 24.151 | | | | |

FIG. 5

| | L0 | L1 | L2 | L3 |
|---|---|---|---|---|
| Start 21.0 | | BCA(L0):Wide pitch Grooves | | |
| Radius 22.2 | Protection zone1: HFM Grooves | Protection zone1:Wobbled Grooves | | |
| Radius 22.512 | PIC:HFM Grooves 2720*4KB, TP 0.35  231 | Reserved  222 | Reserved  223 | OPC3(2048)  204 |
| | | | Buffer zone2(884+β)  213 | |
| | Protection zone2 Reserved  221 | OPC1(2048)  202 | OPC2(2048)  203 | TDMA3(2048)  244 |
| | | | Buffer zone1(884+β)  212 | |
| | | | TDMA2(2048)  243 | Reserved |
| | INFO2:128 Cls. (Reserved, PAC2, DMA2, Control data2 Buffer2) | Buffer zone0(884+β)  211 | | |
| | OPC0(2048)  201 | TDMA1(3072)  242 | Reserved | |
| | TDMA0(1024)  241 | | | |
| Data Zone 24.0 | INFO2:256 Cls. (Pre-write area, Drive area, DMA1, Control data1, PAC1) | | | |

FIG. 23

| (a) Legacy (T)DDS for SL&DL — 2210 | (b) Proposing (T)DDS for TL&QL (Case 1) — 2220 | (c) Proposing (T)DDS for TL&QL (Case 2) — 2240 |
|---|---|---|
| BD-RE/R common part — 2200 | BD-RE/R common part | BD-RE/R common part |
| Inconsistency flags for SBM(2bits) — 2301 | Inconsistency flags for SBM(4bits) — 2311 | Inconsistency flags for SBM(4bits) — 2331 |
| Size of TDMA in Inner Spare Area 0 — 2302 | Size of TDMA in Inner Spare Area — 2312 | Size of TDMA in Inner Spare Area — 2332 |
| Size of TDMA in Outer Spare Area(s) — 2303 | Size of TDMA in Middle Spare Area — 2313 | Size of TDMA in RMSA — 2333 |
| Size of TDMA in Inner Spare Area 1 — 2304 | Size of TDMA in Outer Spare Area — 2314 | Size of TDMA in LMSA — 2334 |
| Reserved bits — 2305 | Reserved bits — 2315 | Size of TDMA in Outer Spare Area — 2335 |
| P_TZ0, P_TZ1 — 2306 | P_TZ0, P_TZ1 — 2316 | P_TZ0, P_TZ1 — 2336 |
| Reserved bits — 2307 | P_TZ2, P_TZ3 — 2317 | P_TZ2, P_TZ3 — 2337 |
| P_1stDFL ~ P_8thDFL — 2308 | P_1stDFL ~ P_8thDFL — 2318 | P_1stDFL ~ P_8thDFL — 2338 |
| Reserved bits | P_9sDFL ~ P_16thDFL — 2319 | P_9stDFL ~ P_16thDFL — 2339 |
| P_SRRI/P_SBM0 | P_SRRI/P_SBM0 — 2320 | P_SRRI/P_SBM0 — 2340 |
| P_SBM1 | P_SBM1 — 2321 | P_SBM1 — 2341 |
| Reserved bits | P_SBM2, P_SBM3 — 2322 | P_SBM2, P_SBM3 — 2342 |
| P_ISA0,P_OSA0,P_OSA1,P_ISA1 — 2309 | P_ISA,P_MSA0,P_MSA1,P_MSA2 — 2323 | P_ISA,P_MSA0,P_MSA1,P_MSA2 — 2343 |
| Reserved bits | P_MSA3,P_MSA4,P_MSA5,P_OSA | P_MSA3,P_MSA4,P_MSA5,P_OSA — 2344 |

BD-R Only Part — 2300

INFORMATION STORAGE MEDIUM, RECORD REPRODUCTION APPARATUS, AND RECORD REPRODUCTION METHOD

CROSS REFERENCE TO RELATED APPLICATION(S)

This application is a continuation of International Patent Application No. PCT/KR2010/001175, filed on Feb. 25, 2010, which claims the benefit of Korean Patent Application No. 10-2009-0015956, filed on Feb. 25, 2009, Korean Patent Application No. 10-2009-0016551 filed on Feb. 26, 2009, and Korean Patent Application No. 10-2010-0016666 filed on Feb. 24, 2010, in the Korean Intellectual Property Office, the entire disclosures of which are incorporated herein by reference for all purposes.

FIELD

The following description relates to an information storage medium, and more particularly, to a multilayer information storage medium, a recording/reproducing apparatus, and a recording/reproducing method.

DESCRIPTION OF RELATED ART

To achieve a high capacity information storage medium or to transmit information via a wire or wireless network, various methods such as recording data on an information storage medium at a high density or in a multilayer structure are being developed. Because an information storage medium has a multilayer structure, each layer of an information storage medium typically includes an area for disc recording/reproducing management.

An example of an area for disc recording/reproducing management is an optical power control (OPC) area. An OPC area is a test area for calibrating power, and is used to find an appropriate power level for recording or reproducing data on or from an information storage medium. Because a test is performed to find an optimal power level, power higher than a normal recording power may be applied, and thus, areas of neighboring layers in the same radius may be damaged. Also, an area of a layer adjacent to an OPC area (in particular, a lower layer in a proceeding direction of an optical beam may be damaged. As such, a multilayer structure typically uses OPC areas. For example, a Blu-ray disc (BD) has OPC areas for a single layer (SL) or dual layers (DL), and additional OPC areas for a triple layer (TL) or quadruple layer (QL) disc.

However, as the number of layers increases the number of OPC areas also increases due to a multilayer structure. Accordingly, there is a need for an efficient management of the OPC areas.

Furthermore, a high capacity information storage medium is generally achieved by a high density of data on each layer of a multilayer structure. Because additional information is required due to the high-density or multilayer structure, an information format according to a conventional standard may not be effective.

For example, the current BD physical standard suggests two types of SL and DL at a recording density of 25 GB per layer. If a TL or QL BD having a recording density of 30 GB to 40 GB per layer is used to achieve a high capacity, due to its high-density/multilayer structure, new information needs to be added to information formats according to the conventional BD standard. Also, if an apparatus for recording/reproducing data on/from both SL/DL BDs and TL/QL BDs is developed in the future, information formats according to TL/QL BD standards, as well as information formats according to current BD standards, have to be recognized.

For example, if an information format for a high-density/multilayer structure is different from a legacy information format, a method of identifying these information formats is needed.

SUMMARY

In one general aspect, there is provided an information storage medium including a plurality of recording layers, wherein each recording layer comprises an inner circumference zone and a data zone, and at least one of the plurality of recording layers comprises a temporary disc management area (TDMA), in the inner circumference zone, for recording information about a defect that is detected in the data zone, wherein a size of a TDMA allocated on an upper layer may be greater than a size of a TDMA allocated on a lower layer.

The size of the TDMA may be recorded in a temporary disc definition structure (TDDS).

In another aspect, there is provided an apparatus for recording data on an information storage medium including a plurality of recording layers, each recording layer including an inner circumference zone and a data zone, and at least one of the recording layers includes, in the inner circumference zone, a temporary disc management area (TDMA) for recording information about a defect detected in the data zone, the apparatus including a pickup configured to transmit data related to the information storage medium, and a control unit configured to control the pickup to record the information about the defect detected in the data zone on the TDMA of the at least one recording layer, wherein a size of a TDMA allocated on an upper layer may be greater than a size of a TDMA allocated on a lower layer.

Information about the size of the TDMA may be recorded on a temporary disc definition structure (TDDS).

In another aspect, there is provided an apparatus for reproducing data from an information storage medium including a plurality of recording layers, each recording layer including an inner circumference zone and a data zone, and at least one of the recording layers includes, in the inner circumference zone, a temporary disc management area (TDMA) for recording information about a defect detected in the data zone, the apparatus including a pickup configured to transmit data related to the information storage medium, and a control unit configured to control the pickup to read the information about the defect from the TDMA of the at least one recording layer, wherein a size of a TDMA allocated on an upper layer may be greater than a size of a TDMA allocated on a lower layer.

Information about the size of the TDMA may be recorded on a temporary disc definition structure (TDDS).

In another aspect, there is provided a method of recording data on an information storage medium including a plurality of recording layers, each recording layer including an inner circumference zone and a data zone, and at least one of the recording layers includes, in the inner circumference zone, a temporary disc management area (TDMA) for recording information about a defect detected in the data zone, the method including transmitting data related to the information storage medium, and recording the information about the defect on the TDMA of the at least one recording layer, wherein a size of a TDMA allocated on an upper layer may be greater than a size of a TDMA allocated on a lower layer.

Information about the size of the TDMA may be recorded on a temporary disc definition structure (TDDS).

In another aspect, there is provided a method of reproducing data from an information storage medium including a plurality of recording layers, each recording layer including an inner circumference zone and a data zone, and at least one of the recording layers includes, in the inner circumference zone, a temporary disc management area (TDMA) for recording information about a defect detected in the data zone, the method including transmitting data related to the information storage medium, and reproducing the information about the defect from the TDMA of the at least one recording layer, wherein a size of a TDMA allocated on an upper layer may be greater than a size of a TDMA allocated on a lower layer.

Information about the size of the TDMA may be recorded on a temporary disc definition structure (TDDS).

Other features and aspects may be apparent from the following detailed description, the drawings, and the claims.

BRIEF DESCRIPTION OF THE DRAWINGS

FIG. 4 is a diagram illustrating a third example of a layout of a BD-R TL/QL (32 GB/L or 33 GB/L).

FIG. 5 is a diagram illustrating a fourth example of a layout of a BD-R TL/QL (32 GB/L or 33 GB/L).

FIGS. 23A through 23C are diagrams illustrating examples of a BD-R only part illustrated in the examples of FIGS. 22A through 22C.

Figure 1:
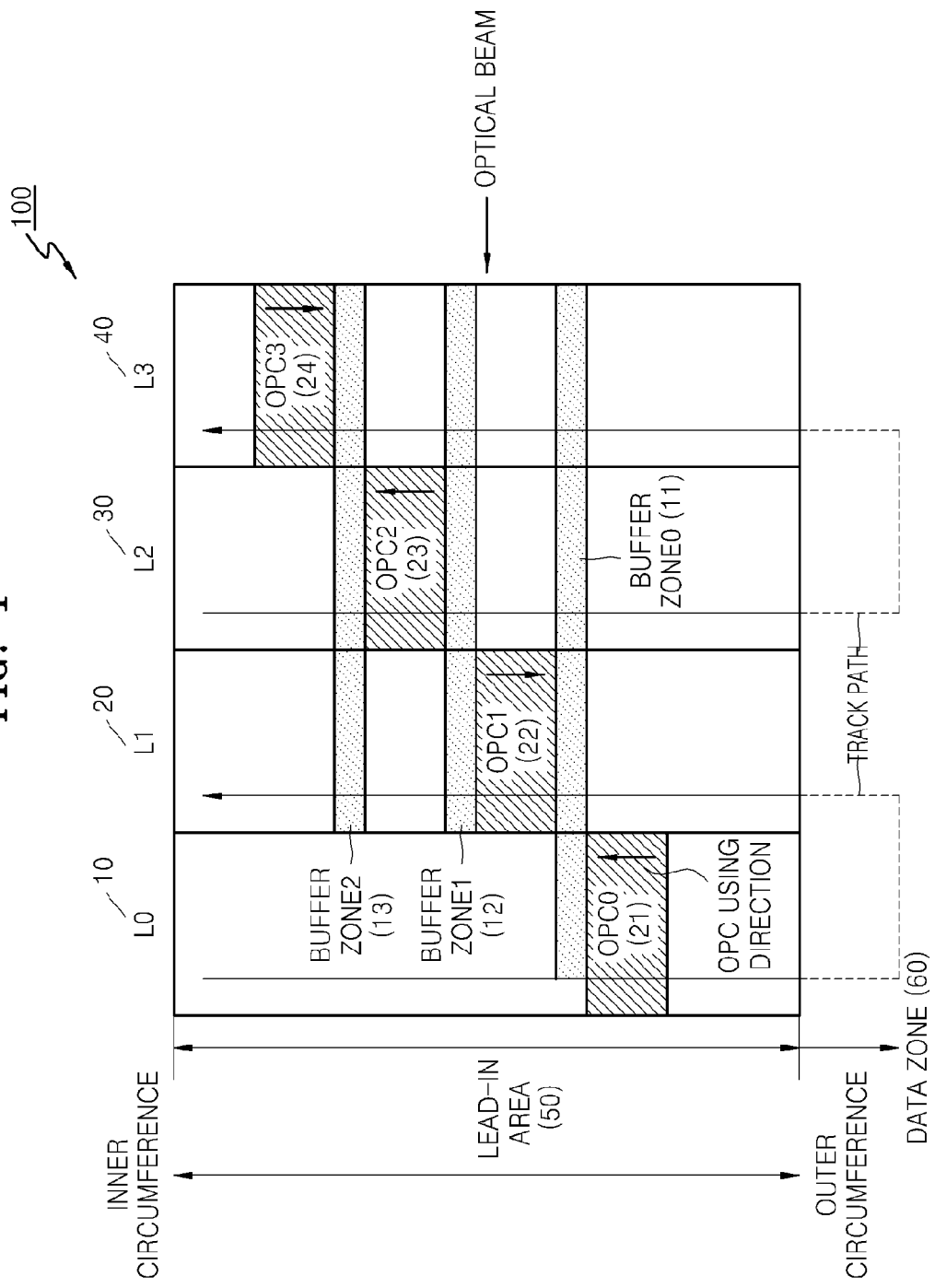
FIG. 1 is a diagram illustrating an example of a layout of a disc for allocating optical power control (OPC) areas to a triple-or-more layer information storage medium in consideration of eccentricity.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Various examples herein are directed towards an information storage medium capable of effectively allocating increased areas due to a multilayer structure of the information storage medium, to recording layers within a fixed range of capacity, and an apparatus and a method using the information storage medium.

The following description also provides a method and apparatus for efficiently managing information formats according to a high-density/multilayer structure of a disc.

As described in various examples, an information storage medium may have a plurality of recording layers, in which each of the plurality of recording layers includes an inner circumference zone and a data zone. At least one of the plurality of recording layers may include, in the inner circumference zone, a temporary disc management area for recording information about a defect detected in the data zone. A size of the temporary disc management area allocated on an upper layer may be greater than the size of the temporary disc management area allocated on a lower layer.

In various examples, by efficiently allocating increased areas on a multilayer information storage medium, compatibility with a conventional standard may be maintained and areas may be effectively allocated. Also, information formats of a high-density/multilayer disc may be efficiently managed.

In a multi-layer information storage medium such as a triple-or-more layer information storage medium, each layer may have at least one optical power control (OPC) area toward an inner circumference and that is allocated so as not to overlap the OPC area of a neighboring layer in the same radius.

An OPC area of each layer may have at least one neighboring buffer zone on the layer, and an OPC area between two OPC areas from among a plurality of two OPC areas corresponding to the number of layers may have neighboring buffer zones in the same radius of a disc.

A buffer zone may have a size greater than a physical area corresponding to interlayer eccentricity according to a disc standard. For example, if it is defined that a disc has to be manufactured with an error of less than a 0.1 mm radius of interlayer eccentricity, the buffer zone may have a size equal to or greater than the 0.1 mm radius.

Interlayer eccentricity refers to a radius error between areas in the same radius, from a standard point (e.g., the center of a completely manufactured disc). For example, if it is defined that a data zone of each recording layer starts from a 24 mm radius, due to manufacturing characteristics, the data zone may not always start in the exact position. Also, because a plurality of recording layers are bonded to manufacture a multilayer disc, an error may exist between layers.

Accordingly, if each recording layer generally has an allowable error of ±0.05 mm and thus has to start from a 24.0±0.05 mm radius, one recording layer may have a data zone that starts from a 23.95 mm radius from a standard point of a completely manufactured disc, and another recording layer may have a data zone that starts from a 24.05 mm radius. In this example, maximum interlayer eccentricity between recording layers may be 0.1 mm. Due to interlayer eccentricity, when OPC areas are allocated, buffer zones have to be allocated in consideration of interlayer eccentricity between neighboring layers. In particular, the influence of an optical beam on lower layers in a proceeding direction of the optical beam cannot be ignored.

FIG. 1 illustrates an example of a layout for allocating optical power control (OPC) areas to a triple-or-more layer information storage medium in consideration of eccentricity.

Referring to FIG. 1, the information storage medium includes four recording layers such as L0 10, L1 20, L2 30, and L3 40. An optical beam is incident on the L3 40. In general, OPC areas may be aligned on a lead-in area and also in a lead-out area. However, in FIG. 1, OPC areas such as OPC0 21, OPC1 22, OPC2 23, and OPC3 24 are aligned on a lead-in area 50 that is toward an inner circumference. In this example, the OPC0 21 is aligned on the L0 10, the OPC1 22 is aligned on the L1 20, the OPC2 23 aligned on the L2 30, and the OPC3 24 is aligned on the L3 40. The OPC areas aligned on two neighboring layers are aligned so as not to overlap each other in a radial direction.

For example, the OPC0 21 and OPC1 22 of the L0 10 and L1 20 that are two neighboring layers are aligned with a gap by a buffer zone0 11 in consideration of interlayer eccentricity such that they do not overlap each other in the radial direction. Likewise, the OPC1 22 and OPC2 23 of the L1 20 and L2 30 are aligned with a gap by a buffer zone1 12 in consideration of interlayer eccentricity such that they do not overlap each other in the radial direction. Also, the OPC2 23 and OPC3 24 of the L2 30 and L3 40 are aligned with a gap by a buffer zone2 13 in consideration of interlayer eccentricity such that they do not overlap each other in the radial direction.

Neighboring buffer zones are aligned on inner and outer portions of an OPC area of a layer that is aligned between two layers that have OPC areas. For example, the neighboring buffer zone1 12 and buffer zone2 13 are aligned on inner and outer portions of the OPC2 23 of the L2 30 that is aligned between the L1 20 having the OPC1 22 and the L3 40 having the OPC3 24. Also, the neighboring buffer zone0 11 and buffer zone1 12 are aligned on inner and outer portions of the OPC1 22 of the L1 20 that is aligned between the L0 10 having the OPC0 21 and the L2 30 having the OPC2 23.

Buffer zones may have a size that is equal to or greater than that of a physical area corresponding to interlayer eccentricity that is defined by a disc standard. For example, if a disc should be manufactured to have an error of interlayer eccentricity between neighboring layers within a 0.1 mm radius, buffer zones may have a size that is equal to or greater than the 0.1 mm radius.

In FIG. 1, data zone 60 starts at a point at which the lead-in area 50 that is toward the inner circumference, ends. In FIG. 1, the information storage medium has an opposite track path (OTP). In the example of FIG. 1, a track path starts from an inner circumference of the L0 10 and proceeds toward an outer circumference of the L0 10, and starts from an outer circumference of the L1 20 and proceeds toward an inner circumference of the L1 20. Likewise, a track path starts from an inner circumference of the L2 30 and proceeds toward an outer circumference of the L2 30, and starts from an outer circumference of the L3 40 and proceeds toward an inner circumference of the L3 40. In this example, a direction for using an OPC area for each layer, i.e., a data recording direction in an OPC area, is opposite to a direction of a track path. For example, the track path on the L0 10 is from the inner circumference toward the outer circumference whereas the direction in which the OPC0 21 is used is from the outer circumference toward the inner circumference.

Accordingly, OPC areas may be allocated in various ways on the L0 10 through L3 40. If OPC areas are allocated on the L2 30 and L3 40 in a way that OPC areas are allocated on the L0 10 and L1 20, a disc may be more conveniently used in terms of recording management.

FIGS. 2 through 10 illustrate examples of a layout of a Blu-ray disc-recordable (BD-R)/Blu-ray disc-rewritable (BD-RE) 32 GB/L or 33 GB/L triple layer (TL) or quadruple layer (QL). A layer that is close to a disc surface, i.e., the L3, is referred to as an upper layer, and a layer that is close to the L0 is referred to as a lower layer. Areas of lower layers in the same radius as an OPC area allocated to an upper layer are all reserved.

In FIGS. 2 through 10, numbers in brackets represent sizes of areas and are only marked on areas for description. The sizes of the areas are merely for purposes of example and should not be construed as limiting the size of the various areas.

Figure 2:
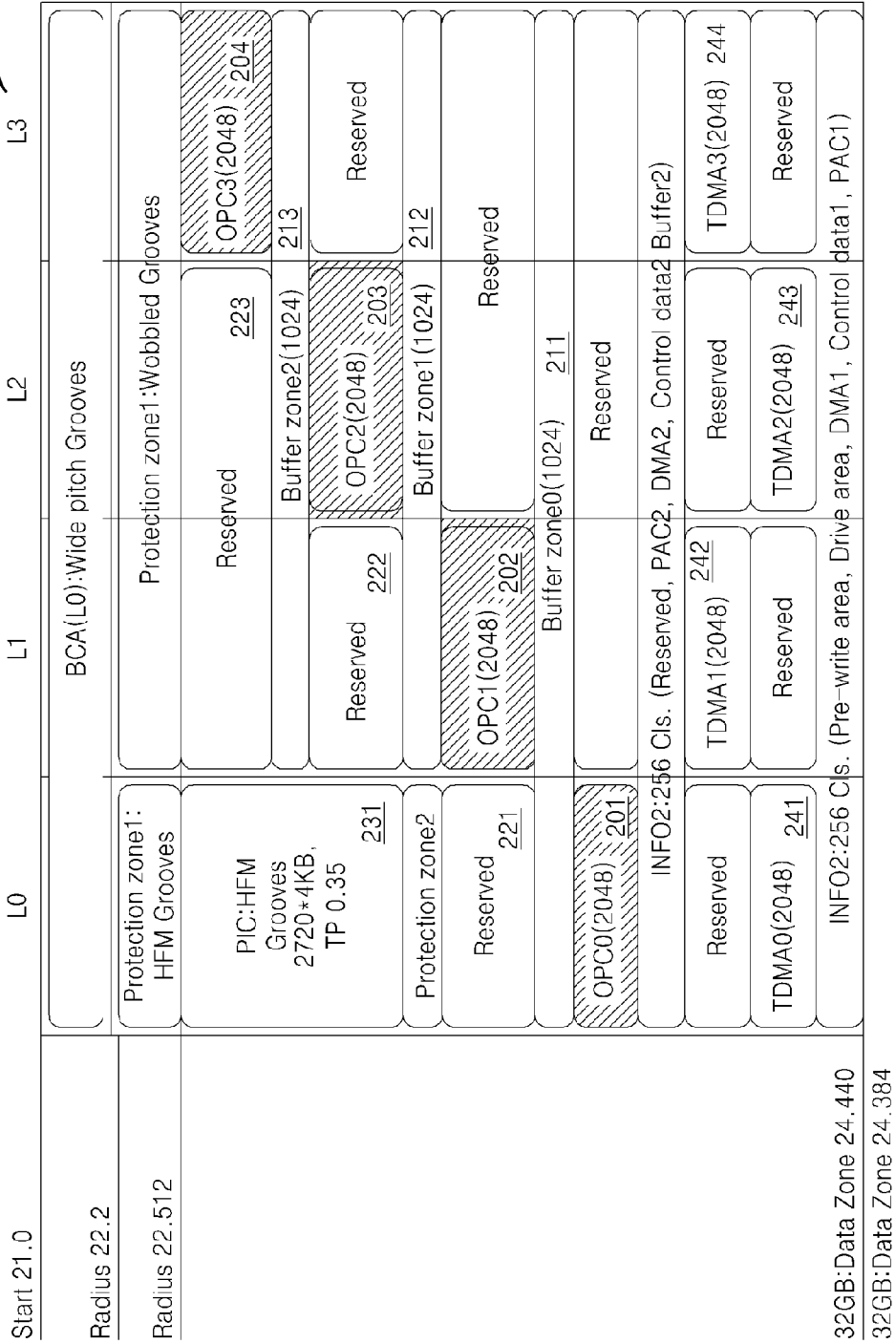
FIG. 2 is a diagram illustrating a first example of a layout of a Blu-ray disc recordable (BD-R) triple layer (TL)/quadruple layer (QL) (32 GB/L or 33 GB/L).

FIG. 2 illustrates a first example of a layout of a BD-R TL/QL (32 GB/L or 33 GB/L).

Referring to FIG. 2, OPC0 201, OPC1 202, OPC2 203, and OPC3 204 are aligned on L0 through L3, respectively, and buffer zone0 211, buffer zone1 212, and buffer zone2 213 are aligned in consideration of interlayer eccentricity so as to prevent overlapping of the OPC areas of neighboring layers. Areas of lower layers in the same radius as an OPC area allocated to an upper layer are reserved areas 221, 222, and 223. For example, areas 223 of the L1 and L2 in the same radius as the OPC3 204 allocated to the L3 are all reserved. In this example, a permanent information and control data (PIC) area 231 on the L0 is an exception because, unlike an area having wobbled grooves, the PIC area 231 has high frequency modulated (HFM) grooves, and thus, may ignore the influence of an OPC area of an upper layer.

Furthermore, in order to manage recording/reproducing of an information storage medium, temporary disc (or defect) management areas (TDMAs), for example, TDMA0 241, TDMA1 242, TDMA2 243, and TDMA3 244, defect management areas (DMAs), physical access control (PAC) areas, drive areas, and control data zones are allocated.

In FIG. 2, the TDMA0 241 through TDMA3 244 are aligned on the L0 through L3, respectively, and are allocated so as not to intervene or overlap the OPC0 201 through OPC3 204 allocated to the L0 through L3. That is, the TDMA0 241 through TDMA3 244 are aligned at an outer side of the OPC0 201 that is aligned at the outermost side from an inner circumference toward an outer circumference from among the OPC0 201 through OPC3 204. In this example, because TDMAs are aligned in a separate space without being influenced by OPC areas, a more simple structure may be achieved and safety may be ensured when using the OPC areas. However, a lead-in area may need a high capacity to separately align the TDMAs.

If OPC areas, TDMAs, DMAs, PAC areas, drive areas, and control data zones are allocated to a 22.512 mm radius, a start of a data zone may be determined according to the density of recording lines and the sizes of OPC areas, buffer zones, TDMAs, and information zones such as INFO1 and INFO2 that are allocated for disc management.

Consequently, a radius r from which a data zone starts may be determined to satisfy the following equation.

$$\pi*(r^2-y^2)=\text{"Channel bit \# of RUB"}*\text{"\# of RUBs in between } y \text{ and } r\text{"}*\text{"Track Pitch"}*\text{"Channel bit length"}.$$

In this example, $\pi=3.141592$, y=PIC start radius, and "# of RUBs in between y and r"=the number of recording unit blocks (RUBs) of wobbled grooves.

The start of the data zone may be determined according to the sizes of OPC areas, TDMAs, buffer zones, and information zones (the number of RUBs may also be referred to as a size).

In FIG. 2, neighboring areas of the OPC0 201 on the same layer, i.e., the L0, are different areas. For example, a neighboring area of the OPC0 201 that is toward the inner circumference is the buffer zone0 211 while a neighboring area toward the outer circumference is the INFO2. As described herein, if a neighboring area of an OPC area is used, for example, if the neighboring area is used to store predetermined data, excessive power may be supplied to the OPC area and thus, in a test process, neighboring areas of the OPC area on the same layer are likely to be damaged.

To prevent damage, at least two tracks (located 0.64 um from the center of a beam because a track pitch is 0.32 um) may be used as a buffer zone, and the buffer zone may be formed in start and/or end portions of an OPC area or in a neighboring area of the OPC area by using an appropriate number of RUBs based on the density of lines. In a 32 GB or 33 GB Blu-ray disc (BD), because a track includes 2.6 to 2.8 RUBs (1932*498 channel bits) in a radius between 22.5 mm and 24.5 mm, at least six RUBs may be used as a buffer zone.

Figure 3:
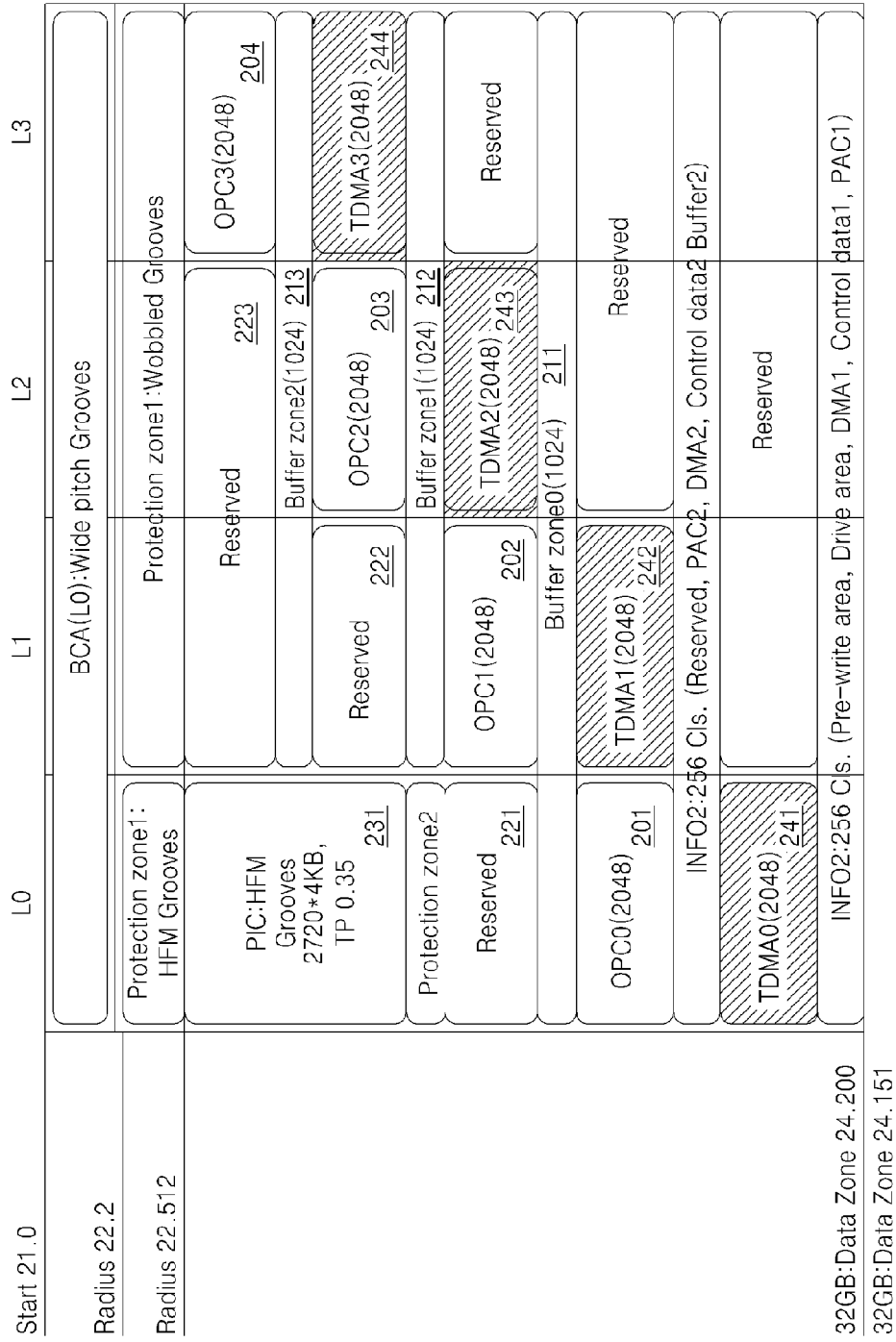
FIG. 3 is a diagram illustrating a second example of a layout of a BD-R TL/QL (32 GB/L or 33 GB/L).

FIG. 3 illustrates a second example of a layout of a BD-R TL/QL (32 GB/L or 33 GB/L).

In FIG. 3, the alignment of OPC areas is the same as and the alignment of TDMAs is different from that of FIG. 2. In FIG. 3, the alignment of TDMAs that is different from that of FIG. 2 is shaded. Although the TDMAs are aligned in a separate section from a section in which OPC areas are aligned in FIG. 2, in FIG. 3, a TDMA of each layer is aligned adjacent to an OPC area of the layer across a buffer zone. In this example, in correspondence with the OPC2 203, the reserved area 222 is aligned on a lower layer, i.e., the L2, and the TDMA3 244 is aligned on an upper layer, i.e., the L3. The above arrangement is enabled because an optical beam that is incident on an upper layer may influence a lower layer of a target layer more than the upper layer. For example, if a test recording is performed on the OPC2 203 of the L2, an optical beam for the test recording may influence the L1 a significant amount and may only slightly influence the L3. Accordingly, the TDMA3 244 may be aligned on the L3 that is only slightly influenced.

As such, a capacity required for a lead-in area may be reduced.

FIG. 4 illustrates a third example of a layout of a BD-R TL/QL (32 GB/L or 33 GB/L).

The layout of FIG. 4 is the same as that of FIG. 3 except for the alignment of the TDMA2 243 and TDMA3 244. Because the L0 has a heat sink, heat is transferred in one direction, and the TDMA1 242 is aligned on a corresponding area of the L1, that is, an area of the L1 corresponding to the OPC0 201 of the L0. However, because heat is transferred in two directions on the L1 through L3, the TDMA2 243 and TDMA3 244 are aligned not to correspond to the OPC1 202 and OPC2 203.

FIG. 5 illustrates a fourth example of a layout of a BD-R TL/QL (32 GB/L or 33 GB/L).

The layout of FIG. 5 is the same as that of FIG. 3 except for the alignment of the TDMA0 241 and TDMA1 242. That is, in order to be compatible with a conventional disc standard that defines a data zone that starts from a 24.0 mm radius of a disc, the size of the TDMA0 241 may be reduced to 1024 bytes, and the size of the TDMA1 242 may be increased by the reduced size of the TDMA0 241, for example, to 3072 bytes. FIG. 5 shows an example of 32 GB/L and in 32 GB/L, a value β is added to the buffer zone0 211, buffer zone1 212, and buffer zone2 213. The value β represents the number of added RUBs.

Figure 6:
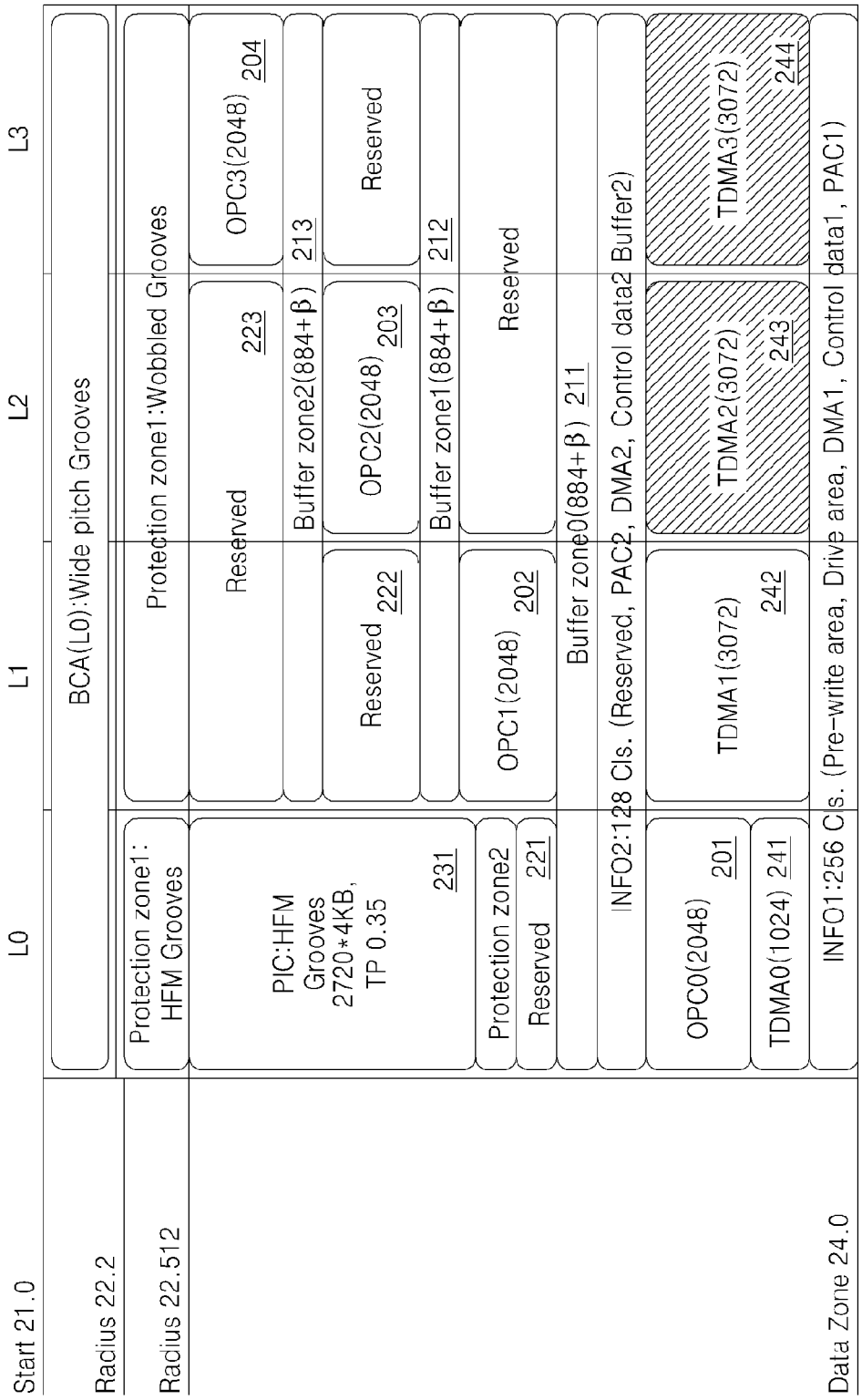
FIG. 6 is a diagram illustrating a fifth example of a layout of a BD-R TL/QL (32 GB/L or 33 GB/L).

FIG. 6 illustrates a fifth example of a layout of a BD-R TL/QL (32 GB/L or 33 GB/L).

The layout of FIG. 6 is the same as that of FIG. 5 except for the alignment of the TDMA2 243 and TDMA3 244 as indicated by the shaded areas. As described herein in relation to FIG. 4, because the L0 has a heat sink and heat is transferred in one direction, the TDMA1 242 is aligned on a corresponding area of the L1, that is, an area of the L1 corresponding to the OPC0 201 of the L0. However, because heat is transferred in two directions on the L1 through L3, the TDMA2 243 and TDMA3 244 are aligned not to correspond to the OPC1 202 and OPC2 203.

Figure 7:
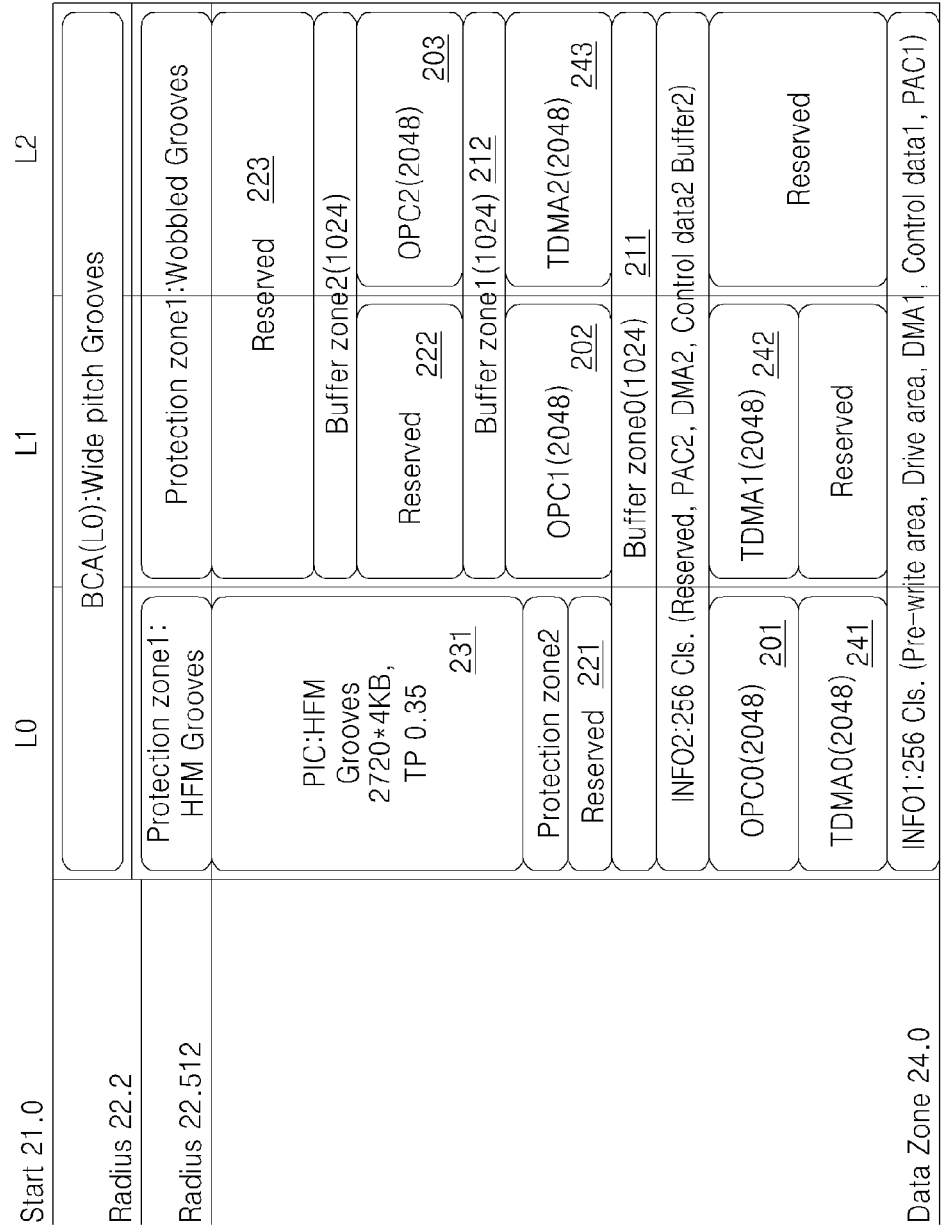
FIG. 7 is a diagram illustrating a first example of a layout of a BD-R TL (32 GB/L or 33 GB/L).

FIG. 7 illustrates a first example of a layout of a BD-R TL (32 GB/L or 33 GB/L).

The layout of FIG. 7 is the same as that of FIG. 3 except that the L3 is not aligned because FIG. 7 shows a TL disc.

Figure 8:
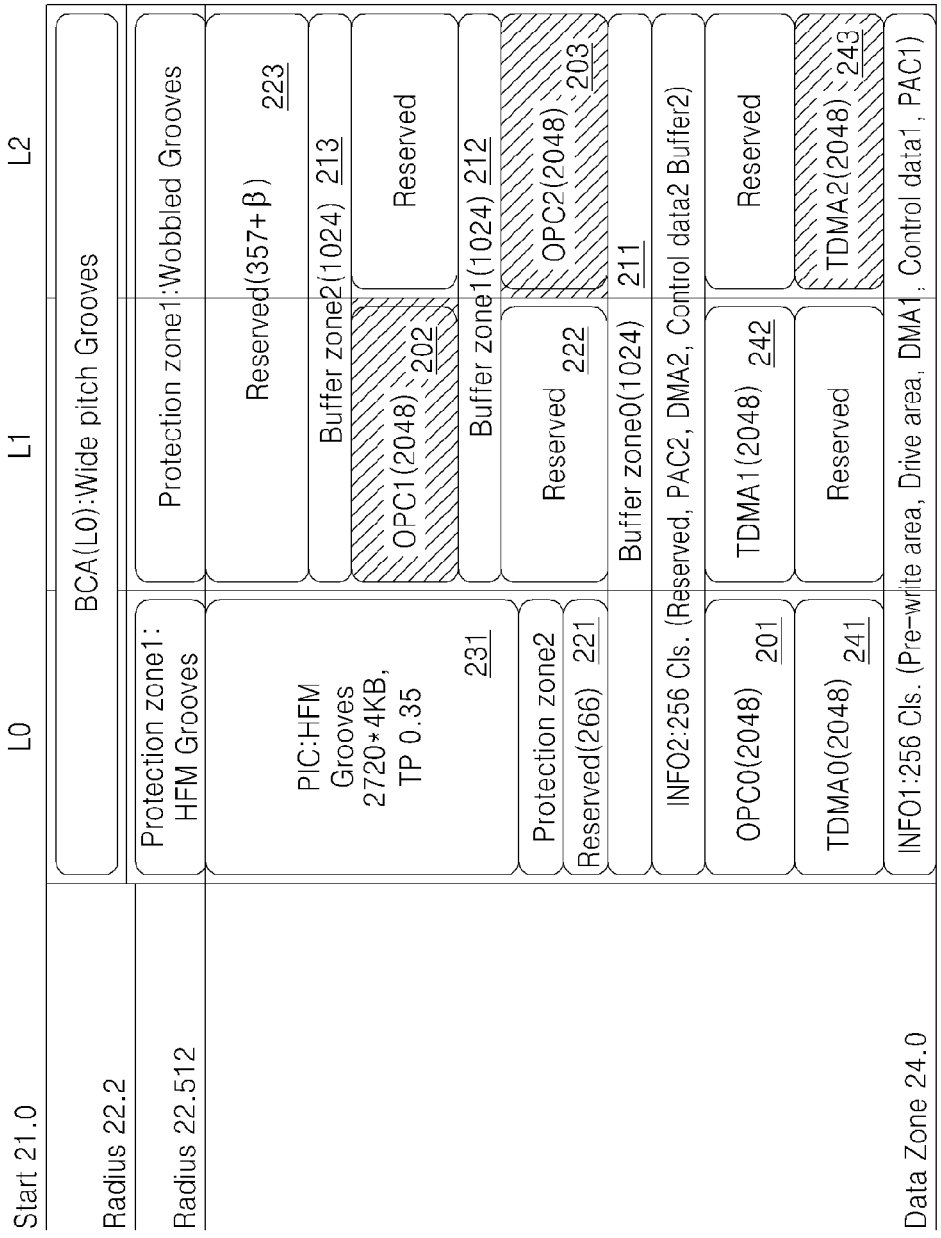
FIG. 8 is a diagram illustrating a second example of a layout of a BD-R TL (32 GB/L or 33 GB/L).

FIG. 8 illustrates a second example of a layout of a BD-R TL (32 GB/L or 33 GB/L).

The layout of FIG. 8 is the same as that of FIG. 7 except for the alignment of the TDMA2 243. As described herein in relation to FIGS. 4 and 6, because the L0 has a heat sink and heat is transferred in one direction, the TDMA1 242 is aligned on a corresponding area of the L1, that is, an area of the L1 corresponding to the OPC0 201 of the L0. However, because heat is transferred in two directions on the L1 through L2, the TDMA2 243 is aligned not to correspond to the OPC1 202. The alignment of the OPC1 22 and OPC2 23 is also different from that of FIG. 7.

Figure 9:
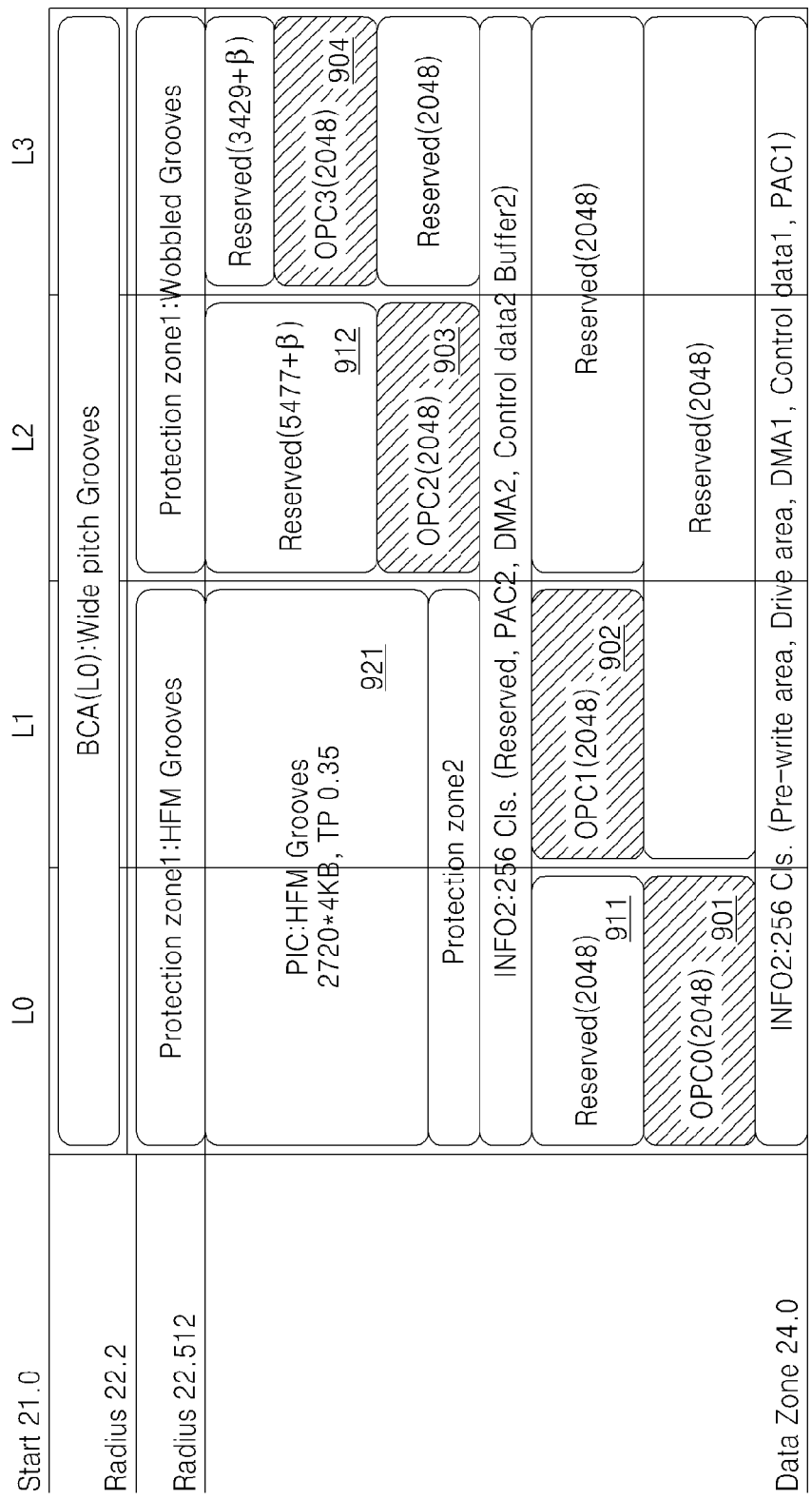
FIG. 9 is a diagram illustrating a first example of a layout of a Blu-ray disc rewritable (BD-RE) TL/QL (32 GB/L or 33 GB/L).

FIG. 9 illustrates a first example of a layout of a BD-RE TL/QL (32 GB/L or 33 GB/L).

A BD-R disc allows only one-time recording and does not allow rewriting, and a BD-RE disc allows rewriting. Because TDMAs are used to temporarily record information used to manage recording and reproducing of a BD-R disc, a BD-RE disc does not need TDMAs.

Accordingly, the layout of FIG. 9 is similar to the layouts of FIGS. 2 through 6 except that TDMA areas are not aligned and a PIC area 921 is aligned on the L0 and also on the L1. A BD-RE dual layer (DL) does not have buffer zones. Although a BD-RE disc does not need buffer zones due to their characteristics, in order to use the structure of a BD-R TL, a BD-RE TL may use buffer zones of the BD-R TL as reserved areas.

Figure 10:
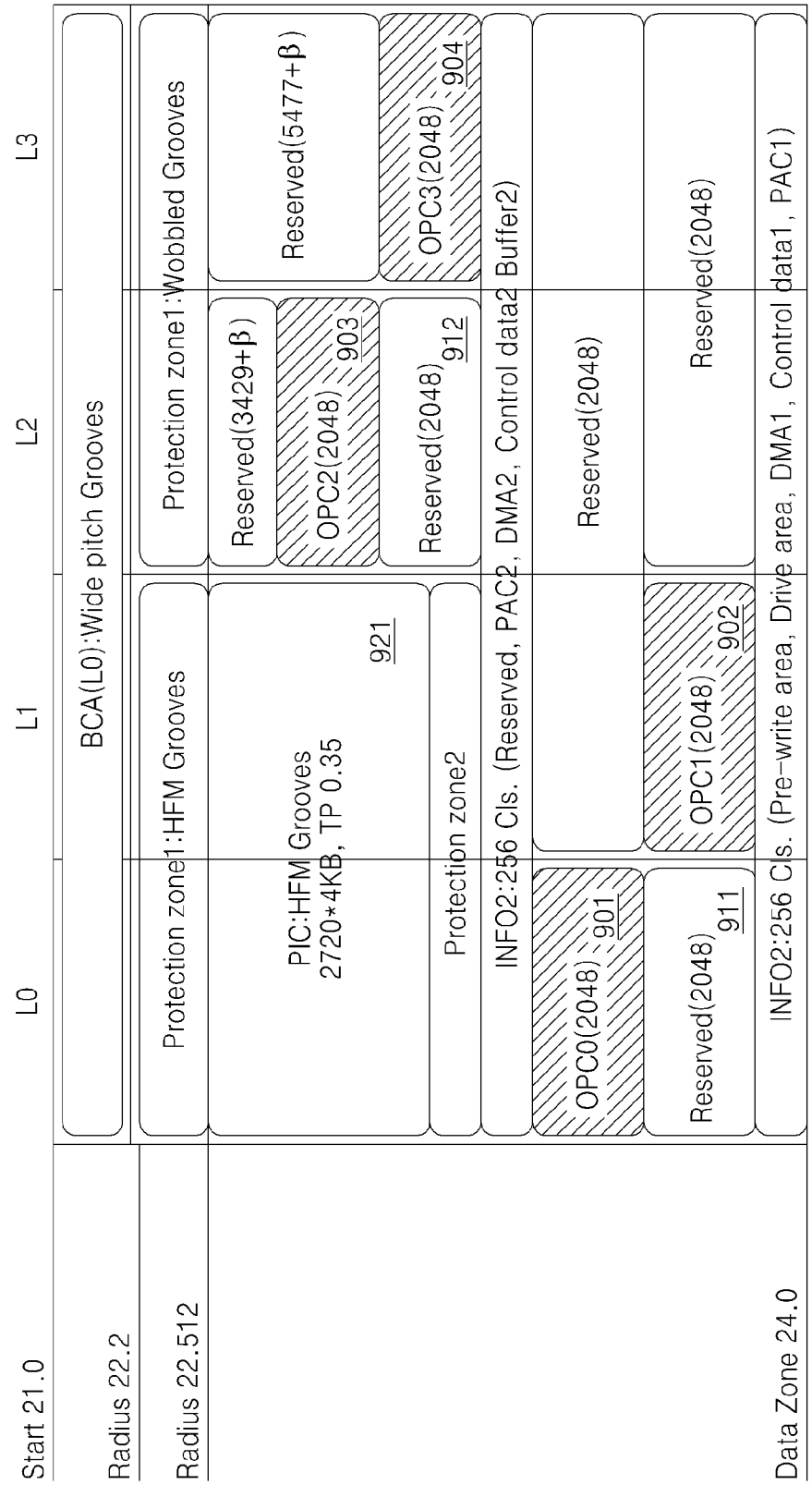
FIG. 10 is a diagram illustrating a second example of a layout of a BD-RE TL/QL (32 GB/L or 33 GB/L).

FIG. 10 illustrates a second example of a layout of a BD-RE TL/QL (32 GB/L or 33 GB/L).

The layout of FIG. 10 is the same as that of FIG. 9 except for the alignment of OPC0 901, OPC1 902, OPC2 903, and OPC3 904.

In the above layouts of FIGS. 2 through 10, the size of each area may vary. For example, the size of an OPC area is 2048 bytes and the size of a TDMA is also mostly 2048 bytes in FIGS. 2 through 10, however, the sizes of areas may be changed, for example, based on a total capacity of a disc.

If the number of recording layers of a write-once information storage medium increases, large disc management areas may be required for defect management, logical overwrite (LOW) management, and recording management of the information storage medium. Due to characteristics of a write-once and non-rewritable information storage medium, disc management areas should be sufficiently allocated in consideration of, for example, a time for using the information storage medium. An example of a method of efficiently utilizing disc management areas of a multilayer information storage medium is described herein.

Initially, terms are defined as the following.

LOW (logical overwrite) refers to a method of allowing logical rewriting on a write-once information storage medium. For example, LOW may be enabled using a linear replacement method such as a defect management method. For example, in order to update data A recorded at an address A into data A', the data A' may be recorded at an address B of an area at which data is not recorded. In this example, the data A at the address A may be a defect. Mapping information between address A and address B may be generated and managed, thereby updating data of a write-once information storage medium.

Recording management refers to a method of recording data on a user area, and may include a random recording for recording data on a desired area regardless of an order of use and a sequential recording method of dividing a user area into one or more areas and sequentially using the divided areas.

TDMA (temporary disc (or defect) management area) refers to an area for recording information used for at least one of defect management, LOW management, and recording management.

TDMS (temporary disc (or defect) management structure) includes temporary disc definition structure (TDDS) information and temporary defect list (TDFL) information for defect management. TDMS refers to information for additional recording management, and may include sequential recording range information (SRRI) and a space bitmap (SBM) according to a recording method.

TDDS (temporary disc definition structure) refers to information for managing basic information for disc management, and may include a TDFL pointer indicating a location of a TDFL, a SRRI pointer indicating a location of SRRI, a SBM pointer indicating a location of an SBM, and the like.

TDFL (temporary defect list) refers to information for managing defect information, replacement information due to a defect, replacement information due to LOW, and the like. The defect information refers to location of defect data, and the replacement information refers to location of replacement data for replacing the defect data.

SBM (space bitmap) refers to information for managing a recording state of a whole disc or a user area, and may be used for recording management in a random recording method. For example, an SBM represents whether data is recorded on each sector divided from a user area by allocating a bit to each sector. For example, a bit value of 1 may be allocated to a sector if data is recorded on the sector, and a bit value of 0 may be allocated to a sector if data is not recorded on the sector.

SRRI (sequential recording range information) refers to information for managing a recordability state and a recording state of each of one or more areas divided from a whole disc or a user area. SRRI may be used for recording management in a sequential recording method.

A TDMS refers to information recorded on a TDMA, and may include a plurality of information items for defect management, LOW management, and recording management. If a certain information item of a TDMS is updated, it may be more efficient to record only the updated information item rather than entire information of the TDMS on a TDMA. In this example, a TDMS update unit may refer to a unit of recording the entire or only a part of information of a TDMS, for example, in consideration of an order or location of recording updated information.

Figure 11:
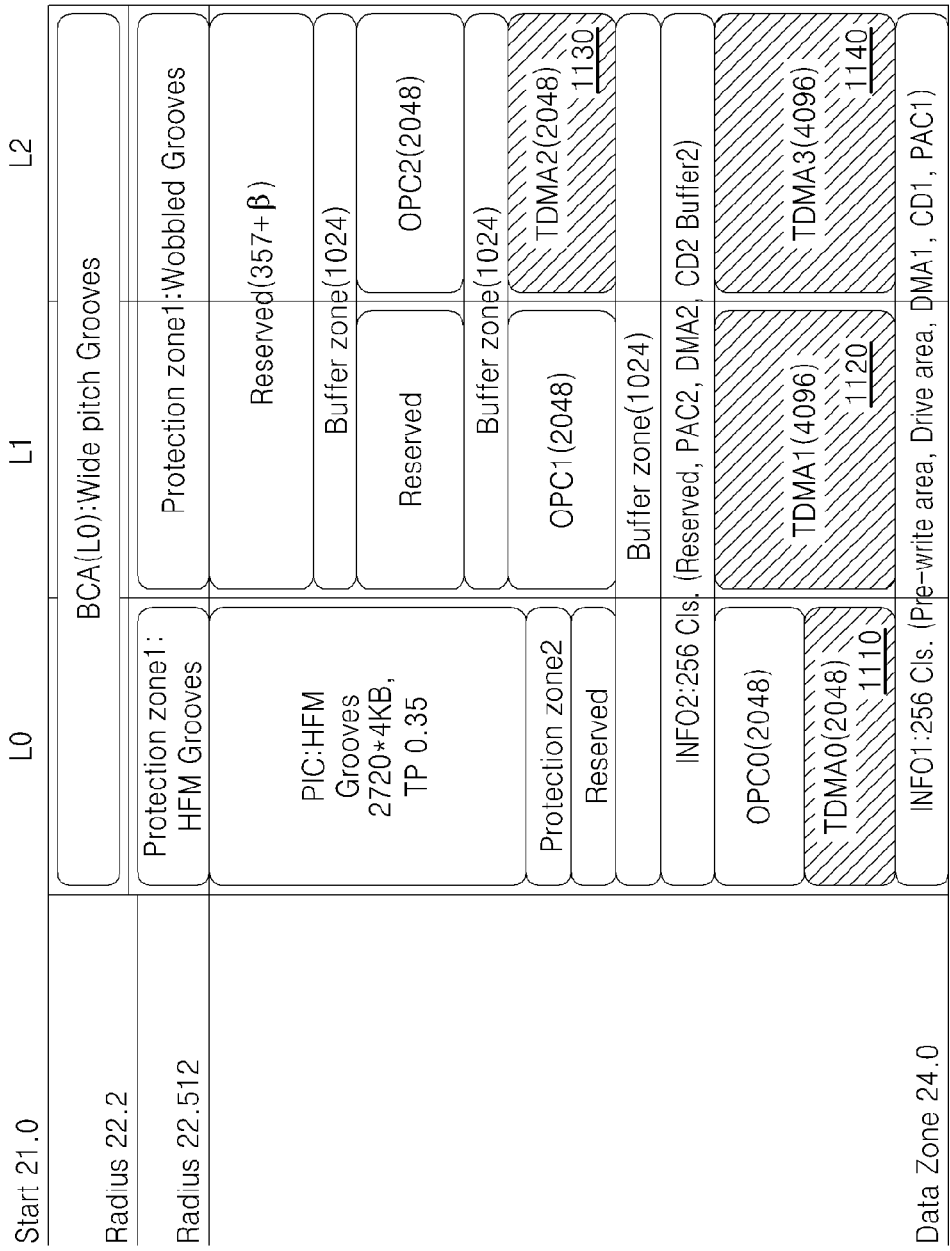
FIG. 11 is a diagram illustrating an example of a layout of an inner circumference zone of a BD-R TL.
Figure 12:
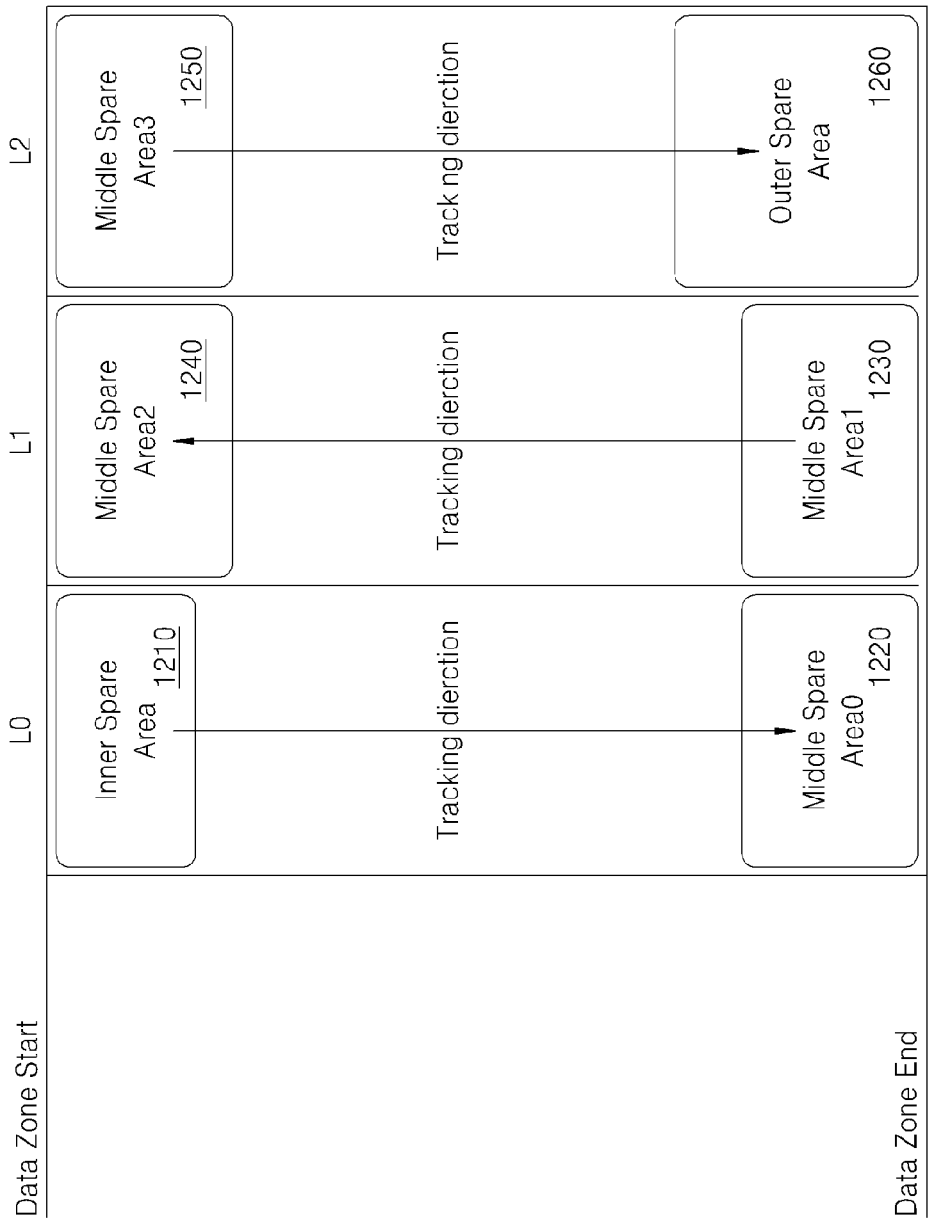
FIG. 12 is a diagram illustrating an example of spare areas allocated to a data zone of a Blu-ray disc recordable/rewritable (BD-R/RE) TL.
Figure 13:
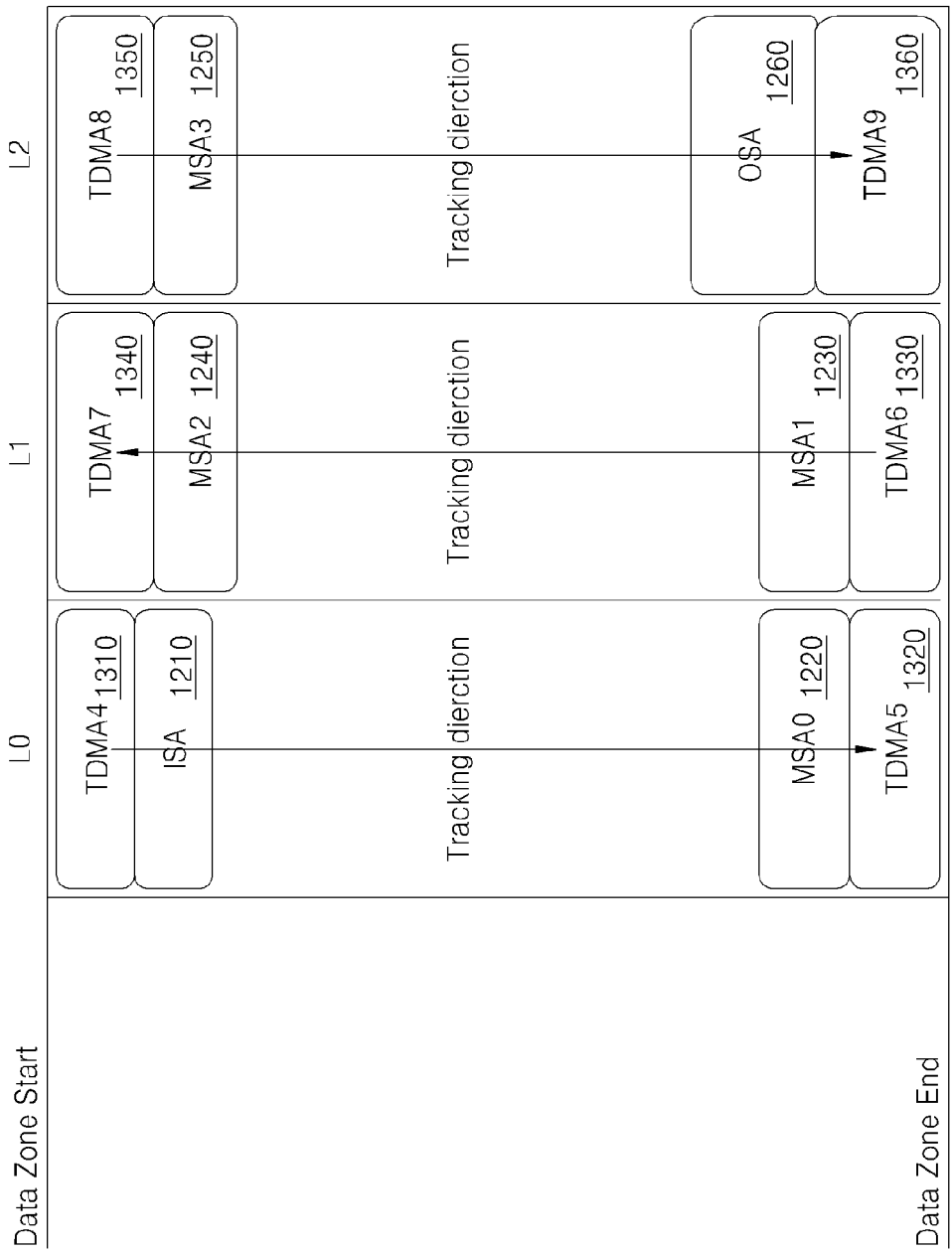
FIG. 13 is a diagram illustrating an example of a layout of temporary disc (or defect) management areas (TDMAs) allocated to spare areas of a BD-R TL.

Examples of disc layouts are illustrated in FIGS. 11 through 13.

FIG. 11 illustrates an example of a layout 1100 of an inner circumference zone of a BD-R TL.

Referring to FIG. 11, TDMA0 1110, TDMA1 1120, TDMA2 1130, and TDMA3 1140 are aligned. In this example, TDMA0 1110 aligned on L0 is 2048 bytes, the TDMA1 1120 aligned on L1 is 4096 bytes, the TDMA2 1130 and TDMA3 1140 aligned on L2 are respectively 2048 bytes and 4096 bytes, and a sum of their sizes is 6144 bytes.

As described herein, for example, the sizes of TDMAs may be increased toward an upper layer, i.e., the L2. As described herein, an upper layer refers to a recording layer such as a layer close to the L2, i.e., a layer on which an optical beam is incident, and a lower layer refers to a recording layer that is away from the upper layer. The layout of FIG. 11 is merely an example and the description is not limited thereto. If the sizes of TDMAs are increased toward an upper layer, a TDMA may not be allocated to a lower layer. That is, not all recording layers require allocation of TDMAs. Also, although the TDMA0 1110 of 2048 bytes is allocated to the L0 in the layout of FIG. 11, the TDMA0 1110 may have a smaller size or a larger size.

The sizes of TDMAs are increased toward an upper layer, i.e., the L2, for the various reasons as described herein.

As described above in relation to FIGS. 2 through 10, in an information storage medium includes a plurality of recording layers. Each recording layer may include an OPC area and buffer zones that are formed in consideration of interlayer eccentricity. Also, in consideration of compatibility with an information storage medium according to a conventional standard, TDMA may be allocated without changing a start location of a data zone, i.e., within a range of the capacity of a lead-in area that is allocated according to the conventional standard. Meanwhile, an optical beam incident on an upper layer may influence a lower layer of a target layer more than the upper layer. For example, if a test recording is performed on OPC1 of the L1, an optical beam for the test recording may significantly influence the L0 and only slightly influence the L2. Accordingly, the TDMA2 1130 may be aligned on the L2 that is only slightly influenced.

In other words, because TDMAs are allocated within a fixed capacity of a lead-in area, and a lower layer of a predetermined recording layer on which an OPC area is aligned may be significantly influenced by an optical beam when test recording is performed on the OPC area. Accordingly, a TDMA may not be aligned on the same radius area of the lower layer. Also, because an upper layer of a predetermined recording layer on which an OPC area is aligned may be less influenced by an optical beam when test recording is performed on the OPC area, a TDMA may be aligned on the same radius area of the upper layer. Accordingly, larger TDMAs may be allocated to upper layers. As such, the capacity of a lead-in area for allocating TDMAs may be reduced.

Also, a maximum size of a TDFL recorded on a TDMA may be 4 clusters on each layer and the size of the TDFL may gradually increase if a disc is used. As such, in a TL disc, the maximum size may be 12 clusters and thus an upper layer may use a larger TDMA.

TDMAs may be used in an order from TDMAs that are allocated toward an inner circumference to TDMAs that are allocated to a data zone. The TDMAs that are allocated toward the inner circumference (or the TDMAs allocated to the data zone) may be used in an order from a lower layer to an upper layer and in a tracking direction.

FIG. 12 illustrates an example of spare areas allocated to a data zone of a BD-R/RE disc. In this example, an inner spare area (ISA), middle spare areas (MSAs), and an outer spare area (OSA) may be allocated.

Referring to FIG. 12, ISA 1210 and MSA0 1220 are aligned on L0, MSA1 1230 and MSA2 1240 are aligned on L1, and MSA3 1250 and OSA 1260 are aligned on L2. A track direction on the L0 is from the ISA 1210 toward the MSA0 1220, a track direction on the L1 is from the MSA1 1230 toward the MSA2 1240, and a track direction on the L2 is from the MSA3 1250 toward the OSA 1260.

In this example, the ISA 1210 has a fixed size of 2048 or 4096 clusters, the MSA1 1230 through MSA3 1250 may have a variable but the same size, and the OSA 1260 is allocated to an end portion of the data zone on a top layer, and may have a variable size. All spare areas are allocated when an information storage medium is initialized. In a BD-R disc, spare areas are used in a tracking direction. However, in a BD-RE disc, spare areas are used in a direction that is opposite to a tracking direction and an OSA is extendable.

FIG. 13 illustrates an example of a layout of TDMAs allocated to spare areas of a BD-R TL.

Referring to FIG. 13, TDMA4 1310 is aligned on the ISA 1210, TDMA5 1320 is aligned on the MSA0 1220, TDMA7 1340 is aligned on the MSA2 1240, TDMA6 1330 is aligned on the MSA1 1230, TDMA8 1350 is aligned on the MSA3 1250, and TDMA9 1360 is aligned on the OSA 1260.

In this example, a TDMA that has a variable size is allocated to each spare area when an information storage medium is initialized. TDMAs allocated to the MSA0 1220 through MSA3 1250 may have the same size, and may be used in a tracking direction. Also, TDMAs allocated to a data zone of a disc may be sequentially used in the tracking direction after TDMAs allocated toward an inner circumference of the disc are completely used.

Figure 14:
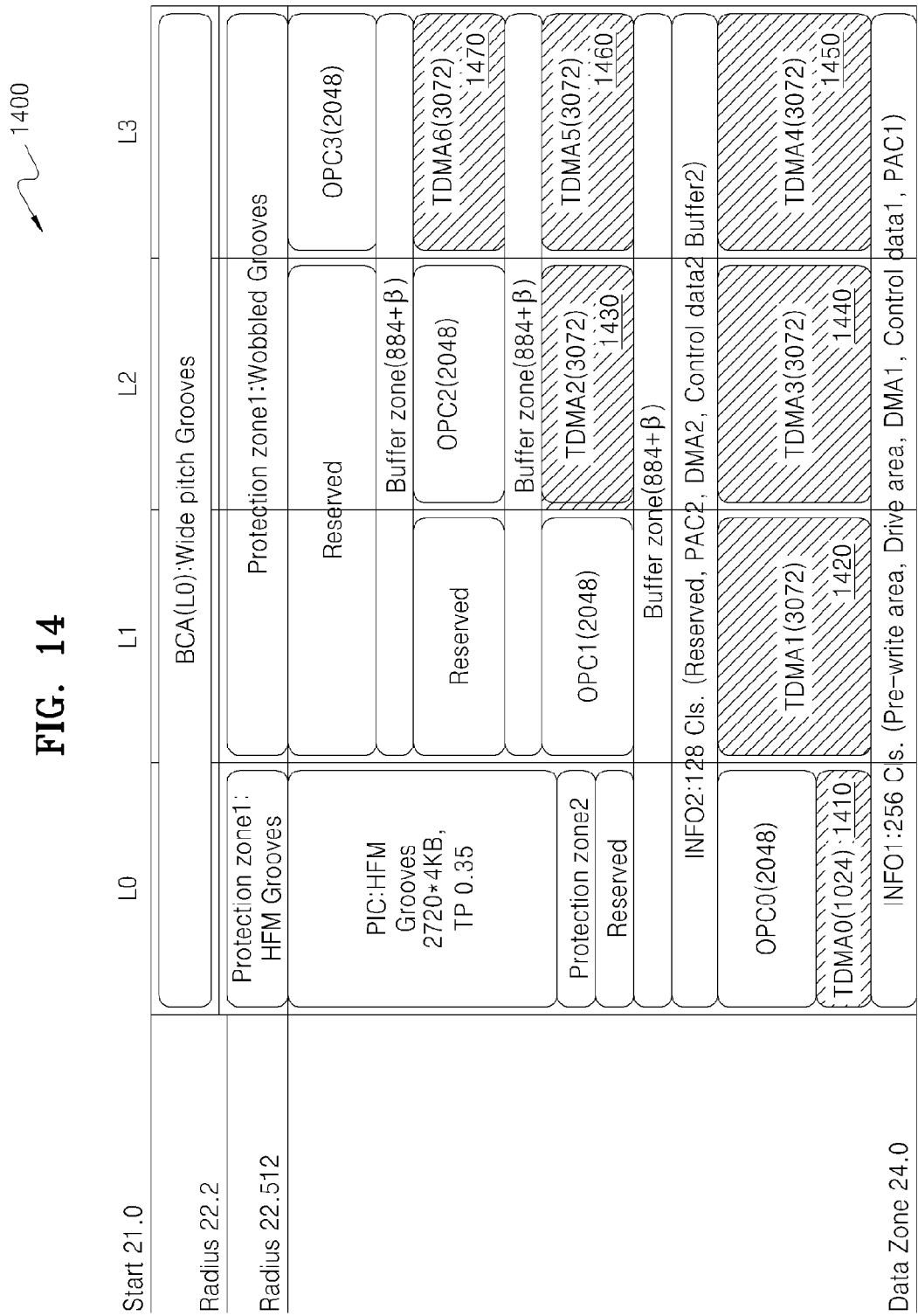
FIG. 14 is a diagram illustrating an example of a layout of an inner circumference zone of a BD-R QL.

FIG. 14 illustrates an example of a layout 1400 of an inner circumference zone of a BD-R QL.

Referring to FIG. 14, TDMA0 1410, TDMA1 1420, TDMA2 1430, and TDMA3 1440 are aligned. The sizes of TDMAs may be increased toward an upper layer, i.e., L3. A maximum size of a TDFL is 4 clusters on each layer and the size of the TDFL is gradually increased if a disc is used. As such, in a QL disc, the maximum size may be 16 clusters and thus an upper layer may use a larger TDMA.

TDMAs may be used in an order from TDMAs that are allocated toward an inner circumference to TDMAs that are allocated to a data zone. The TDMAs that are allocated toward the inner circumference (or the TDMAs allocated to the data zone) are used in an order from a lower layer to an upper layer and in a tracking direction.

Figure 15:
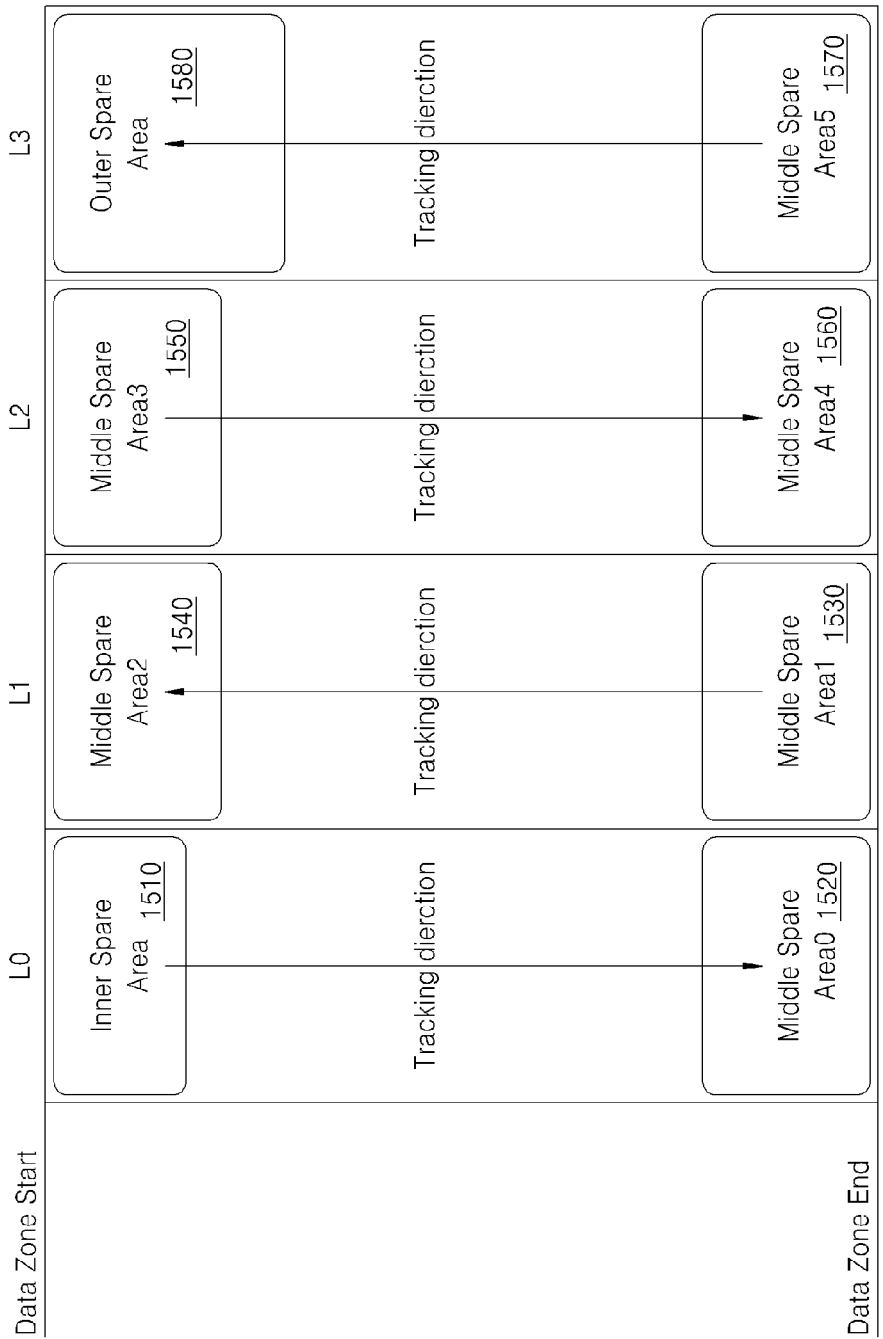
FIG. 15 is a diagram illustrating an example of spare areas allocated to a data zone of a BD-R/RE QL.

FIG. 15 illustrates an example of spare areas allocated to a data zone of a BD-R/RE disc.

Referring to FIG. 15, ISA 1510 and MSA0 1520 are aligned on L0, MSA1 1530 and MSA2 1540 are aligned on L1, MSA3 1550 and MSA 4 1560 are aligned on L2, and MSA 5 1570 and OSA 1580 are aligned on L3. In this example, a track direction on the L0 is from the ISA 1510 toward the MSA0 1520, a track direction on the L1 is from the MSA1 1530 toward the MSA2 1540, a track direction on the L2 is from the MSA3 1550 toward the MSA 4 1560, a track direction on the L3 is from the MSA 5 1570 to the OSA 1580.

In this example, the ISA 1510 has a fixed size of 2048 or 4096 clusters, the MSA1 1530 through MSA 5 1570 may have a variable size but may have the same size, and the OSA 1580 is allocated to an end portion of the data zone on a top layer, and has a variable size. All spare areas are allocated when an information storage medium is initialized. In a BD-R disc, spare areas are used in a tracking direction. However, in a BD-RE disc, spare areas are used in a direction that is opposite to a tracking direction and an OSA is extendable.

Figure 16:
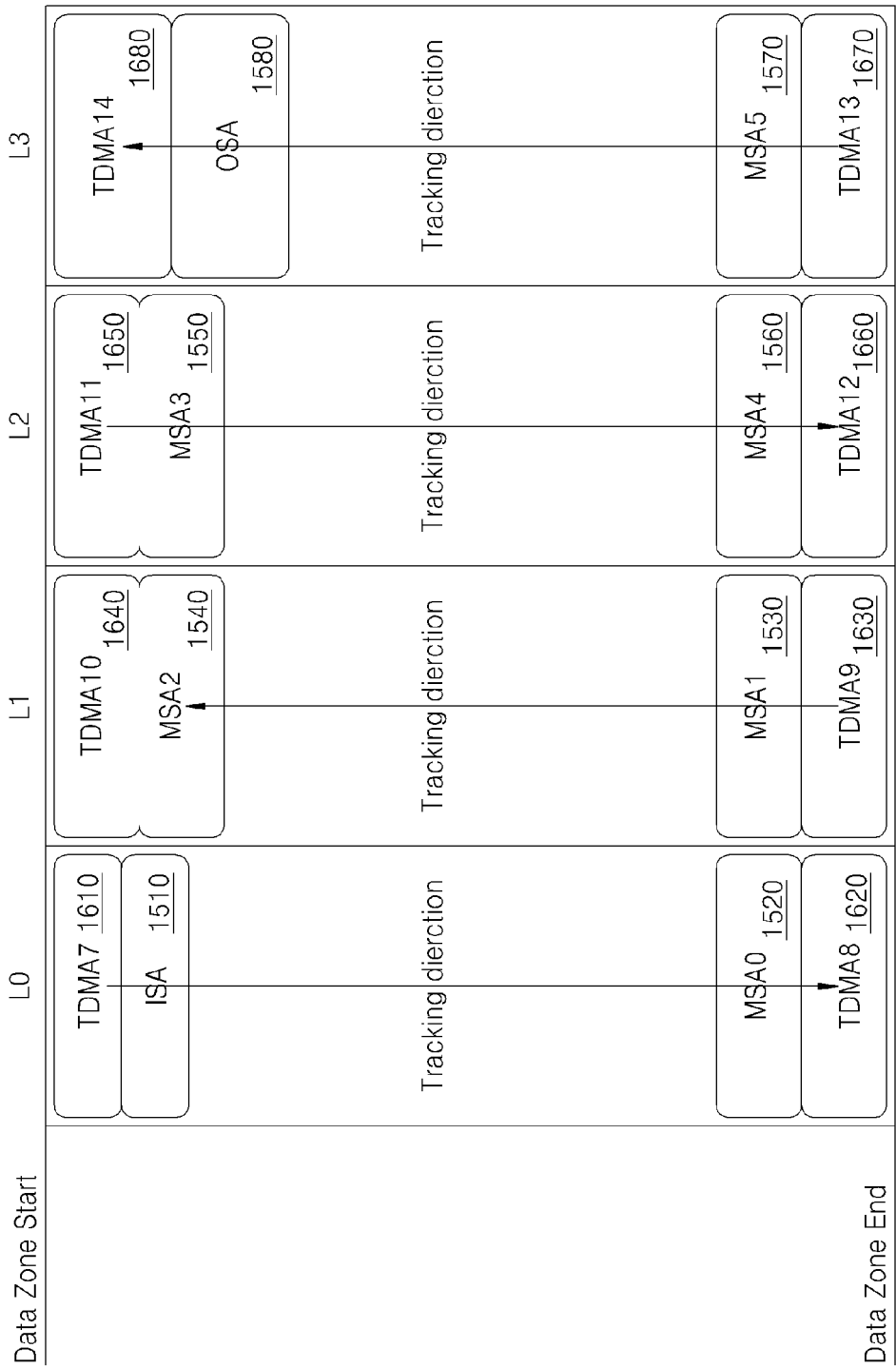
FIG. 16 is a diagram illustrating an example of a layout of TDMAs allocated to spare areas of a BD-R QL.

FIG. 16 illustrates an example of a layout of TDMAs allocated to spare areas of a BD-R QL.

Referring to FIG. 16, TDMA7 1610 is aligned on the ISA 1510, TDMA8 1620 is aligned on the MSA0 1520, TDMA10 1640 is aligned on the MSA2 1540, TDMA9 1630 is aligned on the MSA1 1530, TDMA11 1650 is aligned on the MSA3 1550, TDMA 12 1660 is aligned on the MSA 4 1560, TDMA13 1670 is aligned on the MSA 5 1570, and TDMA14 1680 is aligned on the OSA 1580.

In this example, a TDMA that has a variable size is allocated to each spare area when an information storage medium is initialized. TDMAs that are allocated to the MSA0 1520 through MSA 5 1570 may have the same size, and are used in a tracking direction. Also, TDMAs that are allocated to a data zone of a disc are sequentially used in the tracking direction after TDMAs that are allocated toward an inner circumference of the disc are completely used.

Figure 17:
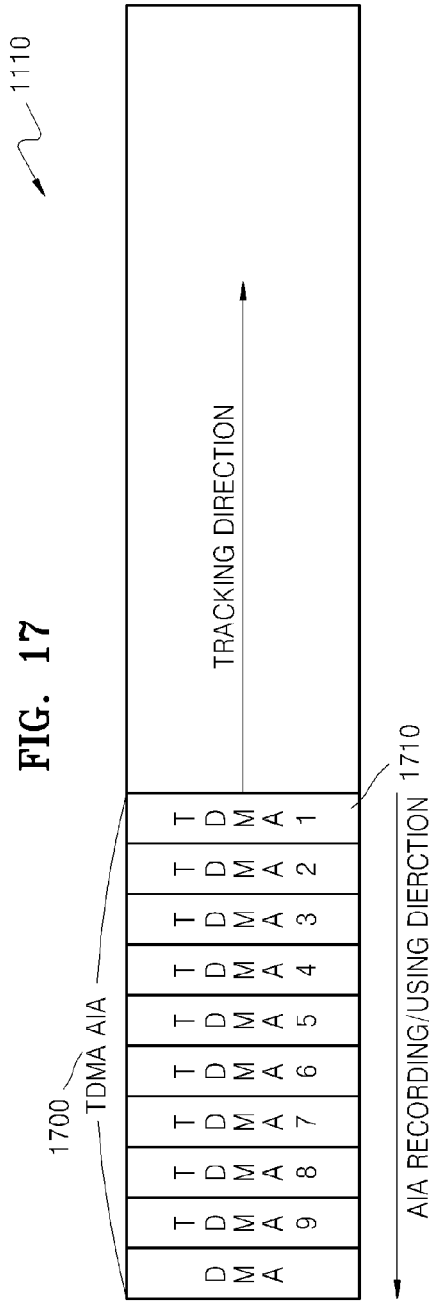
FIG. 17 is a diagram illustrating an example of a TDMA access information area (AIA) in the layouts of FIGS. 11 through 13.
Figure 18:
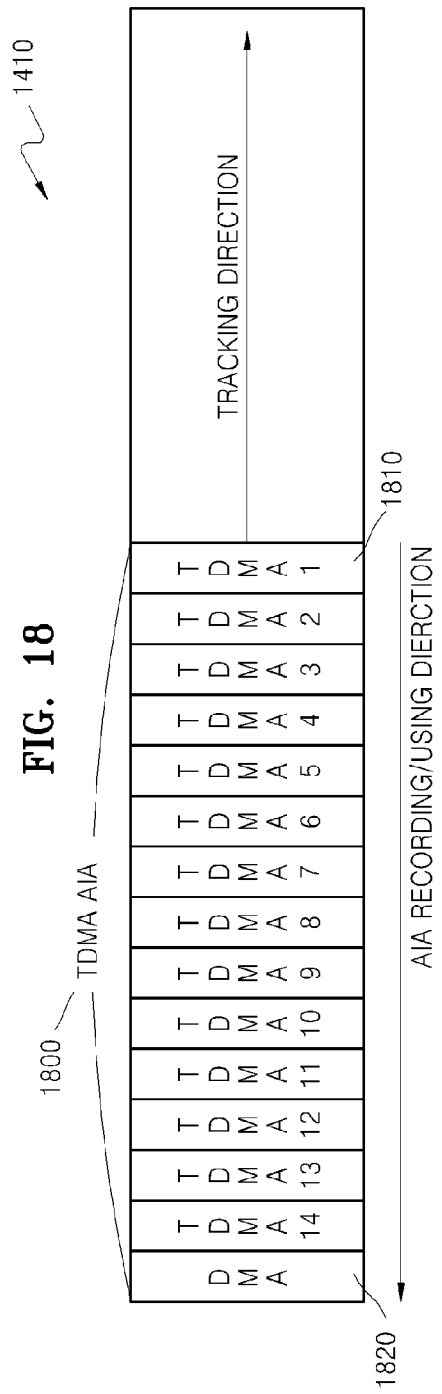
FIG. 18 is a diagram illustrating an example of a TDMA AIA in the layouts of FIGS. 14 through 16.

FIGS. 17 and 18 illustrate examples of a TDMA access information area (AIA) allocated to TDMA0 aligned toward an inner circumference of a multilayer information storage medium. FIG. 17 illustrates a TDMA AIA 1700 in the layouts of FIGS. 11 through 13, and FIG. 18 illustrates a TDMA AIA 1800 in the layouts of FIGS. 14 through 16.

Initial clusters of TDMA0 are allocated toward an inner circumference of L0 of a disc and are used as a TDMA AIA. In this example, a number of clusters corresponding to the number of TDMAs allocated to a whole disc are allocated to a TDMA AIA, each cluster corresponds to one TDMA, a TDDS is recorded on a cluster of the TDMA AIA when a TDMA corresponding to the cluster is used, and the recording is repeated, for example, 32 times to ensure robustness.

For example, if TDMA0 through TDMA9 are allocated to a disc as illustrated in FIGS. 11 through 13, as illustrated in FIG. 17, clusters corresponding to the TDMA1 through TDMA9 and a cluster corresponding to a DMA are allocated to the TDMA AIA 1700.

As another example, if TDMA0 through TDMA14 are allocated to a disc as illustrated in FIGS. 14 through 16, as illustrated in FIG. 18, clusters corresponding to the TDMA1 through TDMA14 and a cluster corresponding to a DMA are allocated to the TDMA AIA 1800.

In FIG. 18, initial 15 clusters of the TDMA0 1410 are used as the TDMA AIA 1800, the TDMA AIA 1800 is in a non-recording state while the TDMA0 1410 is being used, and a TDDS at a corresponding point of time is repeatedly recorded, for example, 32 times on a (15−n+1)th cluster of the TDMA AIA 1800 when TDMAn is used (n=1, 2, ..., 14). For example, if the TDMA1 is used, a TDDS at a corresponding point of time may be repeatedly recorded 32 times on a 15th cluster 1810. That is, a non-recording state of the TDMA AIA 1800 represents that the TDMA0 1410 is being used. Thus, a currently used TDMA may be determined based on a recording state of clusters of the TDMA AIA 1800, and location or section information of the TDMA may be obtained based on recorded TDDS information.

If a first cluster 1820 of the TDMA AIA 1800 is recorded, i.e., if data is recorded on a cluster corresponding to a DMA, it may be determined that a disc is finalized. If the disc is finalized, most of final TDMS information is copied to the DMA but location information of TDFLs in the TDDS may be changed if necessary, because information representing location information of TDMAs allocated to a data zone is stored in the TDDS. TDFLs of the TDMAs are recorded on the DMA when an information storage medium is finalized, and thus, the DMA may be checked instead of the TDMAs. Start location information and end location information of a data zone may be stored on the disc, the TDMAs allocated to the data zone may be allocated to start and end portions of the data zone as illustrated in FIGS. 13 and 16, and the TDDS includes size information of the TDMAs allocated to the data zone. As such, when a disc is loaded into a drive, a location of a TDMA on which the latest TDDS is recorded may be determined based on a TDMA AIA.

In FIGS. 17 and 18, TDMAs are sequentially used and a TDMA AIA is used in a direction that is opposite to a direction in which TDMA0 is used. That is, the TDMA0 is recorded in a tracking direction and the TDMA AIA is used in a direction that is opposite to the tracking direction. For example, in FIG. 17, in the TDMA0 1110, clusters after a 10$^{th}$ cluster corresponding to the TDMA AIA 1700, i.e., after a cluster 1710 corresponding to the TDMA 1, are used in a tracking direction. The TDMA AIA 1700 is used in a direction that is opposite to the tracking direction, and thus is used from the cluster 1710 corresponding to the TDMA1.

An example of a TDMS and a TDMS update is described.

If the size of RUBs is 64 KB, an example of the size of the TDMS and the TDMS update unit is as follows.

TDDS size=2 KB=1 sector
TDFL size=Max. 4 clusters/layer (That is, Max. 12 clusters in a TL structure, and Max. 16 clusters in a QL structure)
SRRI size=Max. 62 KB=Max. 31 sectors
SBMn size=62 KB=31 sectors (n=0, 1, 2, ..., "the number of recording layers"−1)

The sizes of the TDFL and the SRRI are variable while a disc is being used. However, if recorded on a DMA in a finalizing process, the size of the SRRI is fixed to 31 sectors, and the size of the TDFL is fixed to be the same as the size of a defect list (TDMA) of a BD-RE disc (e.g., 12 clusters). If the sizes are fixed, remaining portions may be filled with data such as 00h.

As described herein, the TDMS update unit may include the TDFL, the SRRI, the SBM, and the like. Examples of the TDMS update unit are illustrated in FIGS. 19A through 19D.

FIGS. 19A through 19C illustrate examples in a sequential recording mode, and FIG. 19D illustrates an example in a random recording mode.

FIG. 19A illustrates a structure 1910 in which the TDMS update unit includes a TDFL and a TDDS. In this example, the TDMS update unit includes a TDFL header 1911, a TDFL 1912 of N sectors, a TDDS 1913 of 1 sector, and a remaining portion 1914 set to 00h.

FIG. 19B illustrates a structure 1920 in which the TDMS update unit includes SRRI and a TDDS. In this example, the TDMS update unit includes an SRRI header 1921, SRRI 1922 of M sectors, a TDDS 1923 of 1 sector, and a remaining portion 1924 set to 00h.

FIG. 19C illustrates a structure 1930 in which the TDMS update unit includes a TDFL, SRRI, and a TDDS. In this example, the TDMS update unit includes a TDFL header 1931, a TDFL 1932 of N sectors, an SRRI header 1933, SRRI 1934 of M sectors, a TDDS 1935 of 1 sector, and a remaining portion 1936 set to 00h.

FIG. 19D illustrates a structure 1940 in which the TDMS update unit includes a SBM and a TDDS. In this example, the TDMS update unit includes an SBM header 1941, an SBM 1942 of 31 sectors, and a TDDS 1943 of 1 sector.

A method of preventing early exhaustion of a TDMA caused by the size of a TDFL is described.

Figure 20A:
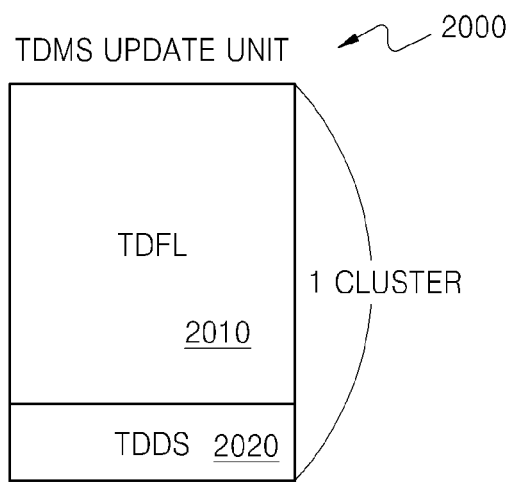
FIGS. 20A and 20B are diagrams illustrating examples of preventing early exhaustion of a TDMA caused by the size of a temporary defect list (TDFL).
Figure 20B:
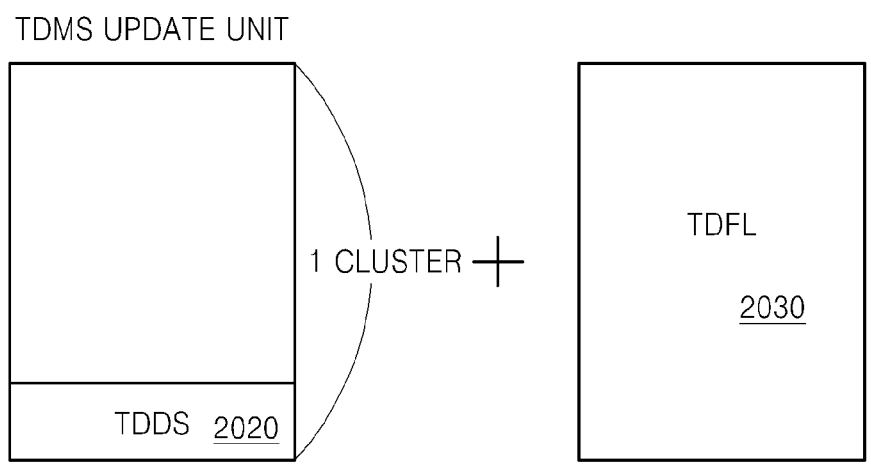

FIGS. 20A and 20B illustrate examples of a first method of preventing early exhaustion of a TDMA caused by the size of a TDFL.

In the first method, if a TDMS update unit including a TDFL exceeds a predetermined size, the TDFL is excluded from the TDMS update unit and is recorded in a separate space. For example, if the TDMS update unit includes the TDFL and a TDDS, before the TDMS update unit exceeds a predetermined size, for example, one cluster, as illustrated in FIG. 20A, a TDMS update unit 2000 including a TDFL 2010 and a TDDS 2020 is recorded. However, if the size of the TDFL is increased and the size of the TDMS update unit including the TDFL exceeds the predetermined size, as illustrated in FIG. 20B, the TDFL is separated from the TDMS update unit and only a TDFL 2030 is recorded in a separate space.

Figure 19:
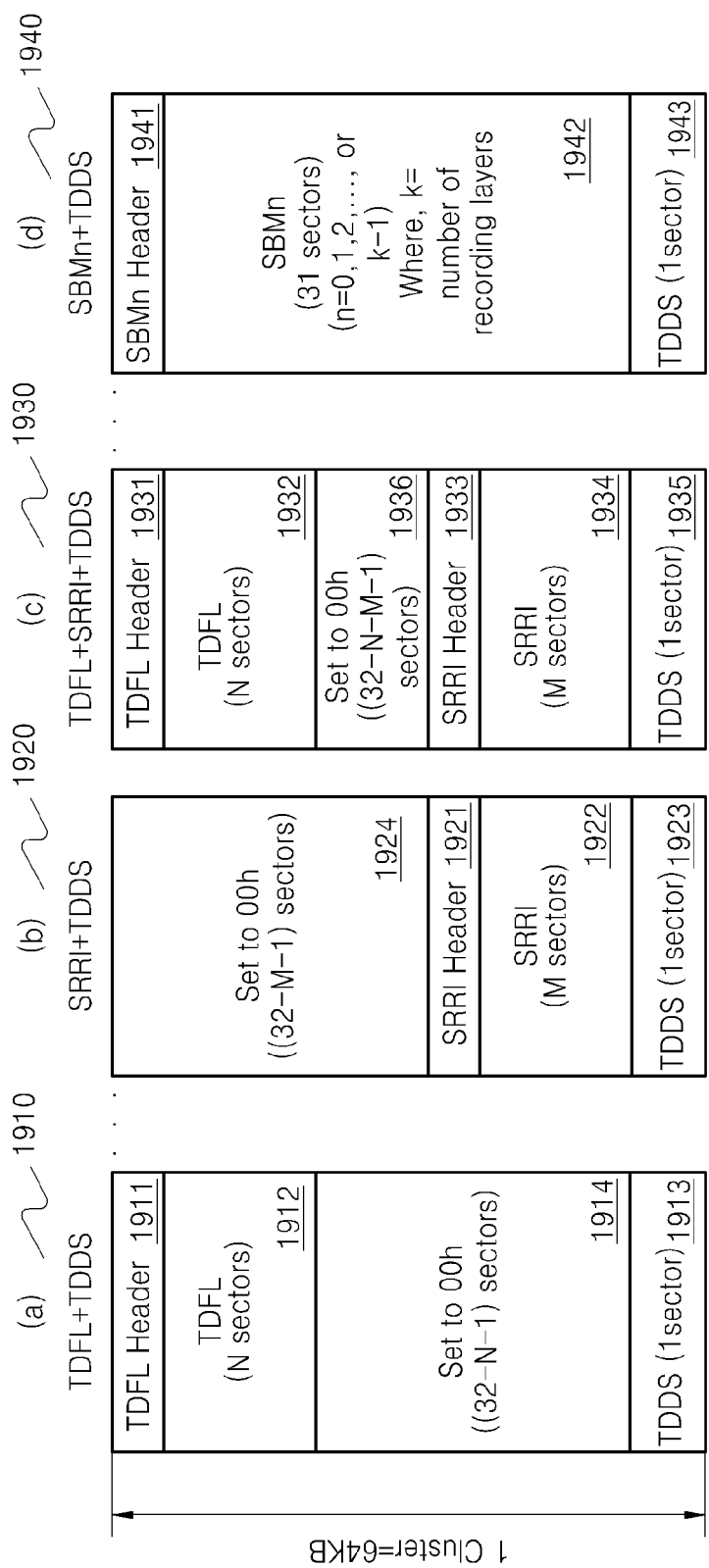
FIGS. 19A through 19D are diagrams illustrating examples of a temporary disc (or defect) management structure (TDMS) update unit.

In a sequential recording mode, as described herein in relation to FIG. 19, the TDMS update unit may be recorded in three formats as shown below.

(a) TDFL+TDDS
(b) SRRI+TDDS
(c) TDFL+SRRI+TDDS

In cases (a) and (c), if the size of the TDMS update unit including the TDFL is fixed to one cluster but exceeds the one cluster, the TDFL is excluded from the TDMS update unit and is recorded on a disc as a separate cluster. In case (b), because the TDMS update unit does not include the TDFL, the following description is not applied.

In a random recording mode, the TDMS update unit includes a combination of an SBM and a TDDS of a recording layer in one cluster in a format as shown below and the TDFL is recorded on a disc as a separate cluster.

SBMn+TDDS

If the first method, the latest TDDS always has the latest SRRI pointer, the latest TDFL pointers (a pointer for each TDFL cluster), and the latest SBMn pointers).

In a TL/QL disc, a maximum size of a TDFL size may be 12/16 clusters and the size of the TDFL is generally increased if the disc is used. Thus, the size of the TDMS update unit including the TDFL may exceed one cluster in some instances. In this case, the TDFL is recorded on a user data zone of a data zone as a separate cluster and the TDMS update unit including a final TDDS having location information of the recorded TDFL is recorded on a TDMA.

For example, when updated, a TDMA may use only one cluster. If the size of a TDFL is increased and may not be included in the TDMS update unit of one cluster, the TDFL is recorded on a user data zone and one cluster of the TDMS update unit including a final TDDS having location information of the recorded TDFL is recorded on the TDMA.

In this example, a TDMS may be updated a number of times corresponding to the number of clusters in a TDMA and thus a disc may be used for an extended period of time by allocating a minimum number of TDMAs.

In the above example, the size of the TDMS update unit is one cluster for convenience of explanation but is not limited thereto. For example, a maximum size of the TDMS update unit may be generalized to n such as 2, 4, 8, 12 and the like, number of clusters. In this example, if the size of a TDMS update unit including a TDFL exceeds n clusters, the TDFL is recorded on a user data zone of a data zone as separate clusters and the TDMS update unit including a TDDS having location information of the recorded TDFL is recorded on a corresponding TDMA.

Figure 21A:
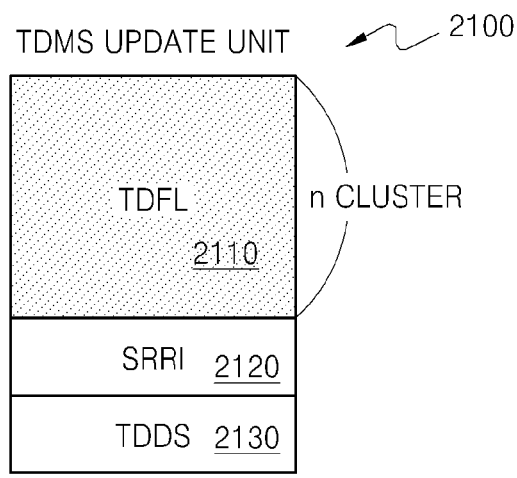
FIGS. 21A and 21B are diagrams illustrating examples of preventing early exhaustion of a TDMA caused by the size of a TDFL.
Figure 21B:
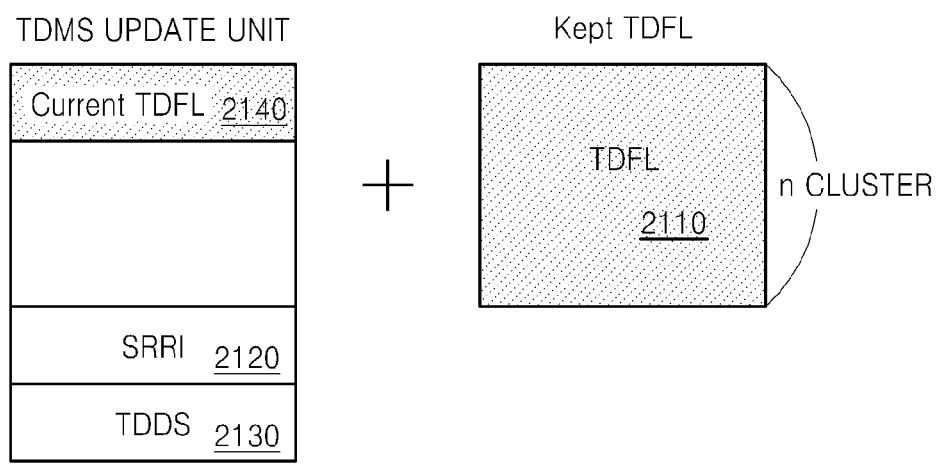

FIGS. 21A and 21B illustrate examples of a second method of preventing early exhaustion of a TDMA caused by the size of a TDFL.

In the second method, a TDMS update unit including a TDFL having a size equal to or less than a certain size (e.g., n clusters) is ordinarily recorded on a TDMA. If the TDFL exceeds a certain size, a portion of the TDFL corresponding to the certain size may be kept on a predetermined area (e.g., a data zone, a TDMA, a disc management area, etc.) of a disc, and TDMA entries generated after the TDFL exceeds the certain size are formed as a current TDFL to record the TDMS update unit including the current TDFL on the TDMA. In this example, location information of the kept TDFL and location information of the current TDFL are stored and managed in a TDDS.

Referring to FIG. 21A, when the size of a TDFL 2110 included in a TDMS update unit 2100 does not exceed n clusters, the TDFL 2110 is included in the TDMS update unit 2100 and is recorded together with SRRI 2120 and a TDDS 2130. However, if the size of the TDFL exceeds n clusters, as illustrated in FIG. 21B, a portion of the TDFL corresponding to n clusters is kept as TDFL 2110 in a separate space, and a remaining portion of the TDFL other than the portion corresponding to the n clusters is included in the TDMS update unit as a current TDFL 2140.

For example, in a QL disc, if a certain size of a TDFL to be included in a TDMS update unit is 8 clusters, a TDDS has kept TDFL pointers (8 pointers) indicating a kept TDFL and current TDFL pointers (8 pointers) indicating a current TDFL.

Before the size of the TDFL exceeds 8 clusters, the kept TDFL pointers may be set to 00h and the current TDFL pointers manage location information of clusters of the actually recorded current TDFL. In this example, if the size of the TDFL exceeds 8 clusters, the initial 8 clusters of the TDFL are recorded and kept on a currently used TDMA or data zone, or a separate disc management information area (a DMA, a TDFL keeping area, etc.), and location information of the kept clusters is managed as the kept TDFL pointers of a TDDS. The other TDMA entries are included in the TDMS update unit as a separate TDFL, are recorded on a TDMA, and are managed as current TDFL pointers.

If a currently used TDMAm is completely used and thus a TDMAm+1 is used, the kept TDFL and the current TDFL may be reconfigured. If the size of the current TDFL exceeds 8 clusters, initial 8 clusters of the current TDFL may be managed by using the kept TDFL pointers and the other clusters may be managed using the current TDFL pointers. That is, the kept TDFL may not be changed each time the TDFL is changed but may be updated all at once at a certain point of time. For example, in a structure using the kept TDFL and the current TDFL, when the TDFL is changed, the kept TDFL is maintained without a change and only the current TDFL is changed and updated. The kept TDFL may be reconfigured and changed only at a predetermined point of time.

Examples of instances in which the kept TDFL is reconfigured are provided in the following cases.

As an example, TDMA entries of a TDFL include state information+a defect address+a substitution address, and are sorted and aligned according to a certain standard, for example, the state information and the defect address. TDMA entries generated after the initial 8 clusters are kept (entries additionally generated due to a defect or LOW) are managed as a current TDFL and then, if a TDMA to be used is changed and the kept TDFL and the current TDFL are combined, the size of the TDFL may be reduced. This is because, if LOW occurs when TDMA entries exist, because TDMA entries of the kept TDFL are old and TDMA entries of the current TDFL are new, the old entries are to be substituted by the new entries.

For example, when an entry representing that data A is to be substituted by data B exists in the kept TDFL, if the data B is substituted by data C, an entry representing that the data B is substituted by the data C is stored in the current TDFL. In this example, because only an entry representing that the data A is substituted by the data C is required, if the kept TDFL and the current TDFL are reconfigured, the capacity of the TDFL may be saved. Accordingly, when a current used TDMA is completely used and thus a next TDMA is used, if the kept TDFL and the current TDFL are sorted and reconfigured all at once as described above, the space of the TDFL may be saved. Accordingly, a disc may be efficiently used by allocating a minimum number of TDMAs.

If an old entry in the kept TDFL is immediately updated whenever a new entry is updated, due to the updating of the kept TDFL, TDMAs may not be efficiently used. For example, if the size of the TDFL is equal to or greater than 9 clusters and is less than 10 clusters, a LOW occurs in a previous area of an area corresponding to a defect address of a first TDMA entry, a TDMA entry will be generated. In this example, because a defect address of the TDMA entry is less than the defect address of the existing first TDMA entry of the TDFL, the TDMA entry will be sorted as the first TDMA entry and the existing first TDMA entry will be shifted. In this example, clusters of the TDFL are different from the clusters of the existing TDFL, and all clusters, i.e., 10 clusters, have to be recorded on a TDMA when the TDFL is updated.

When the second method is used, data is reproduced as described below.

If a data reproducing command is received from a host, it is initially checked to determine whether a physical sector number (PSN) of data to be reproduced exists from among TDMA entries of a current TDFL. If there is no such TDMA entry in the current TDFL, a substitution is checked from among TDMA entries of a kept TDFL. If there is such a TDMA entry in the kept TDFL, data of a substitution address stored in the TDMA entry of the kept TDFL is reproduced. Otherwise, if there is no such TDMA entry in the kept TDFL, data of the PSN is reproduced. If there is such TDMA entry in the current TDFL, data of a substitution address stored in the TDMA entry of the current TDFL is reproduced.

An example of a method of processing an information format in correspondence with a high-density/multilayer structure of an information storage medium is described herein.

In various examples, information fields to be added/changed due to a high-density/multilayer structure of an information storage medium are added/changed, and a format version number of an information format may be set differently from that of a legacy information format.

Also, if information fields of a legacy information format are added/changed due to a high-density/multilayer structure of an information storage medium, the information fields may be redefined in such a way that the meanings of the information fields are interpretable.

Typically a rewritable information storage medium for disc (or defect) management has disc definition structure (DDS), defect list (DFL), and PAC formats.

In the DDS format, because spare area allocation information, spare area full flags, and status bits of PAC locations are included, due to a high-density/multilayer structure, required information fields have to be added/changed or redefined.

In the DFL format, because the size of the DFL format is increased due to a multilayer structure, the DFL format having a changed size has to be identified using, for example, a method of changing a format version.

In the PAC format, because information representing whether each area (including a reserved area) allocated to a disc is recordable/reproducible is included, due to a high-density/multilayer structure, if the sizes, locations, and uses of areas allocated to a disc are added/changed, information fields have to be added/changed or redefined.

Figure 22:
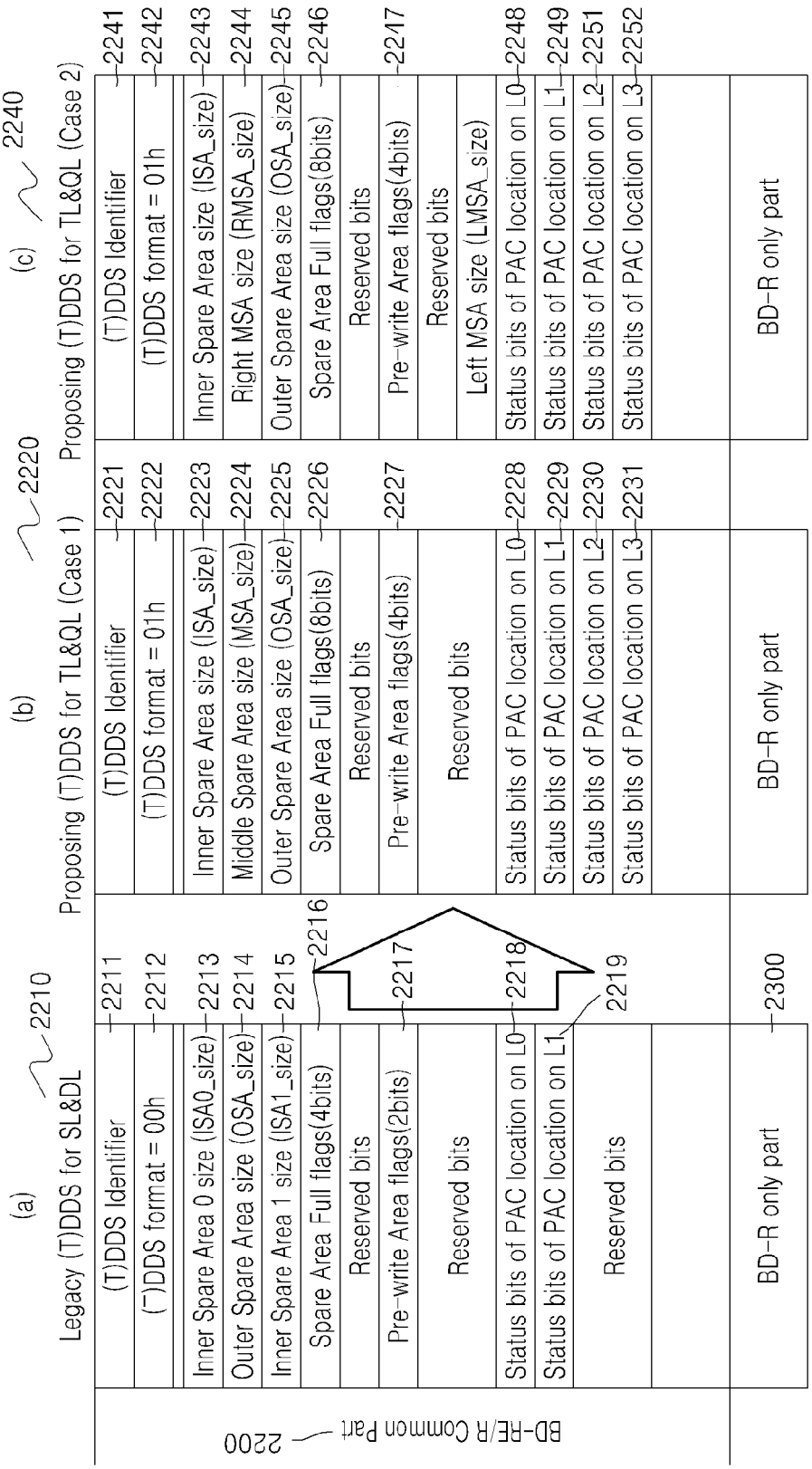
FIGS. 22A through 22C are diagrams illustrating examples of a disc definition structure (DDS) format of a rewritable information storage medium (e.g., a BD-RE disc) and a temporary disc definition structure (TDDS) format of a write-once information storage medium (e.g., a BD-R disc).

FIGS. 22A through 22C illustrate examples of a DDS format of a rewritable information storage medium (e.g., a BD-RE disc) and a TDDS format of a write-once information storage medium (e.g., a BD-R disc).

Referring to FIGS. 22A through 22C, a legacy (T)DDS format for SL/DL includes a BD-RE/R common part 2200 and a BD-R only part 2300. The BD-RE/R common part 2200 is applied commonly to a BD-RE disc and a BD-R disc, and the BD-R only part 2300 is applied to only a BD-R disc. In a BD-RE disc, all bytes of the BD-R only part 2300 are filled with 00h.

Referring to FIG. 22A, in this example, the BD-RE/R common part 2200 of a legacy (T)DDS format 2210 for SL/DL includes a (T)DDS identifier field 2211 for identifying a (T)DDS format, a (T)DDS format number field 2212 that is set to 00, an ISA0 size field 2213, an OSA size field 2214, an ISA1 size field 2215, a spare area full flags field 2216, a reserved bits field, a pre-write area flags field 2217, a reserved bits field, a state bits of PAC location on L0 field 2218, a state bits of PAC location on L1 field 2219, and a reserved bits field.

In this example, the spare area full flags field 2216 represent whether spare areas included in an information storage medium are filled with data. The pre-write area flags field 2217 represent whether a drive records data on a pre-write area of each layer of an information storage medium.

The state bits of PAC location on L0 and L1 fields 2218 and 2219 represent the state of data recorded on each block or cluster included in a PAC area. For example, the state bits of PAC location on L0 and L1 fields 2218 and 2219 may represent whether the data recorded on each block or cluster included in the PAC area is valid or invalid.

A first example of a (T)DDS format for TL/QL is described with reference to FIG. 22B.

The BD-RE/R common part 2200 of a (T)DDS format 2220 for TL/QL includes a (T)DDS identifier field 2221 for identifying a (T)DDS format, a (T)DDS format number field 2222 set to 01h, an ISA size field 2223, an MSA size field 2224, an OSA size field 2225, a spare area full flags field 2226, a reserved bits field, a pre-write area flags field 2227, a reserved bits field, a state bits of PAC location on L0 field 2228, a state bits of PAC location on L1 field 2229, a state bits of PAC location on L2 field 2230, and a state bits of PAC location on L3 field 2231.

An ISA is a spare area that is allocated at the innermost side in a tracking direction and may be, for example, the ISA 1210 illustrated in FIG. 12 or the ISA 1510 illustrated in FIG. 15.

An OSA is a spare area that is allocated at the outermost side in a tracking direction and may be, for example, the OSA 1260 illustrated in FIG. 12 or the OSA 1580 illustrated in FIG. 15.

MSAs are spare areas that are allocated between an ISA and an OSA.

In FIG. 22B, in order to identify a legacy SL/DL (T)DDS from a TL/QL (T)DDS, a (T)DDS format code is changed. For example, a (T)DDS format code number may be set as 00h (see the (T)DDS format number field 2212 illustrated in FIG. 22A) on the SL/DL disc, and may be set as 01h (see the (T)DDS format number field 2222 illustrated in FIG. 22B) on the TL/QL disc.

Also, legacy spare area size fields are redefined and an MSA size field is represented as one field, i.e., the MSA size field 2224, by allocating MSAs to have the same size. In this example, the number of MSAs is 4 on a TL disc, and is 6 on a QL disc.

In this example, the spare area full flags field 2226 is allocated as 8 bits because a maximum number of spare areas is increased from 4 to 8, the pre-write area flags field 2227 is allocated as 4 bits because the number of pre-write area flags is increased from field 2 to 4 by the number of layers, and the state bits of PAC location on L2 and L3 fields 2230 and 2231 are newly allocated for PAC areas on the L2 and L3. If additional information fields are allocated using the reserved bits as described above, byte(bit) positions of information fields of a legacy format may be maintained in a new format, variations in format may be minimized, and thus a controller of a recording/reproducing apparatus may easily manage a disc.

A second example of a (T)DDS format for TL/QL is described with reference to FIG. 22C.

The BD-RE/R common part 2200 of a (T)DDS format 2240 for TL/QL includes a (T)DDS identifier field 2241 for identifying a (T)DDS format, a (T)DDS format number field 2242 that is set to 01h, an ISA size field 2243, a right MSA (RMSA) size field 2244, an OSA size field 2245, a spare area full flags field 2246, a reserved bits field, a pre-write area flags field 2247, a reserved bits field, a left MSA (LMSA) size field 2248, a state bits of PAC location on L0 field 2248, a state bits of PAC location on L1 field 2249, a state bits of PAC location on L2 field 2251, and a state bits of PAC location on L3 field 2252.

FIG. 22C is similar to FIG. 22B except that flexibility is provided in allocating spare areas by allocating RMSAs toward an outer circumference of a disc and LMSAs toward an inner circumference of the disc to have different sizes, instead of allocating all MSAs to have the same size. In FIG. 22C, the LMSA size field 2248 is added using reserved bits. In FIGS. 22A and 22B, the sizes of spare areas are represented using three fields. However, in FIG. 22C, the sizes of spare areas are represented using four fields. That is, one spare area size field is added to a legacy information format. As such, flexibility may be provided to allocate spare areas by allocating spare areas toward an outer circumference of a disc and spare areas toward an inner circumference of the disc to have different sizes.

Although not shown in FIG. 22C, the LMSA size field 2248 may be aligned under the OSA size field 2245 and the other fields after the LMSA size field 2248 may be sequentially aligned on remaining fields. In this example, byte positions of fields after spare area size fields are changed.

An example of a TDDS format of a write-once information storage medium is described herein.

A write-once information storage medium for disc management and defect management includes DDS and TDMA formats for defect management, TDDS, TDFL, SRRI (or SBM) formats for temporary disc (or defect) management, and a PAC format for controlling physical access to an area of a disc.

In the TDDS format, because spare area allocation information, spare area full flags, status bits of PAC locations, TDMA allocation information of a data zone, OPC pointers indicating OPC areas, inconsistency flags, pre-write area flags, TDFL pointers indicating TDFLs, SBM pointers indicating SBMs, and SA pointers indicating spare areas are included, due to a high-density/multilayer structure, information fields have to be added/changed or redefined.

FIGS. 23A through 23C illustrate examples of a BD-R only part of a write-once information storage medium in a TDDS format. FIGS. 23A through 23C illustrate structures of the BD-R only part 2300 illustrated in FIGS. 22A through 22C.

Referring to FIG. 23A, in this example, the BD-R only part 2300 of the legacy (T)DDS format 2210 for SL/DL includes an inconsistency flags for SBM field 2301, a size of TDMA in ISA0 field 2302, a size of TDMA in OSA field 2303, a size of TDMA in ISA1 field 2304, a reserved bits field, a P_TZ0, P_TZ1 field 2305, a reserved bits field, P__1sTDFL-P__8th-TDMA field 2306, a reserved bits field, a P_SRRI/P_SBM0 field 2307, a PSBM1 field 2308, a reserved bits field, a P_ISA0, P_OSA0, P_OSA1, P_ISA1 field 2309, and a reserved bits field.

Referring to FIG. 23B, in this example, the BD-R only part 2300 of the (T)DDS format 2220 for TL/QL includes an inconsistency flags for SBM field 2311 (4 bits), a size of TDMA in ISA field 2312, a size of TDMA in MSA field 2313, a size of TDMA in OSA field 2314, a reserved bits field, a P_TZ0, P_TZ1 field 2315, a P_TZ2, P_TZ3 field 2316, a reserved bits field, a P__1sTDFL-P__8thTDMA field 2317, a P__9sTDFL-P__16thTDMA field 2318, a P_SRRI/P_SBM0 field 2319, a PSBM1 field 2320, a P_SBM2, PSBM3 field 2321, a P_ISA, P_MSA0, P_MSA1, P_MSAOPC2 field 2322, and a P_MSA3, P_MSA4, P_MSA5, P_OSA field 2323.

In FIG. 23B, byte (bit) positions of information fields of a legacy format are maintained in a new format, and fields additionally required due to an increase in the number of layers are formed using existing reserved bits.

Because SBM2 and SBM3 are added, the inconsistency flags for SBM field 2311 are expanded from 2 bits into 4 bits. Inconsistency flags for SBM represent whether recording states of data actually recorded on a disc are consistent with SBM information. Because it may not be efficient to update an SBM each time data is recorded on a disc, the SBM may be updated at a certain point of time based on a recording state of the disc. If an actual recording state is consistent with SBM information, a consistency flag may be set. If updating is not performed, and thus, an actual recording state is not consistent with SBM information, an inconsistency flag may be set.

In FIG. 23B, 4 (for TL) or 6 (for QL) TDMAs are allocated to 4 (for TL) or 6 (for QL) MSAs to have the same size. The TDMAs are defined using one field, i.e., the size of TDMA in MSA field 2313.

P_TZn represents a next available physical sector number of a test area (OPC area) aligned on Ln (n=0, 1, 2, 3). In FIG. 23B, the P_TZ2, P_TZ3 field 2316 for TL/QL OPC areas is added using reserved bits.

P_nthTDMA represents a first PSN of an nth cluster (n=1, 2, . . . , 16) of a TDMA. In FIG. 23B, the P__9sTDFL-P__16thTDMA field 2318 due to an increase in maximum size of a TDFL is added using reserved bits.

P_SBMn represents a first PSN of an SBM for Ln (n=0, 1, 2, 3). One SBM exists on each layer. In FIG. 23B, the P_SBM2, PSBM3 field 2321 for TL/QL SBMs are added using reserved bits. P_SRRI represent a first PSN of SRRI.

P_ISA (OSA or MSAn) represents a next available PSN of an ISA (OSA or MSAn (n=0, 1, 2, 3, 4, 5)). In FIG. 23B, because a maximum number of spare areas is increased from 4 to 8, the P_ISA, P_MSA0, P_MSA1, P_MSAOPC2 field 2322 for next available PSNs for 4 spare areas allocated to first and second layers (L0 and L1) is redefined, and the P_MSA3, P_MSA4, P_MSA5, P_OSA field 2323 for next available PSNs for 4 spare areas allocated to third and fourth layers (L2 and L3) is added. For a TL disc, all bytes of P_MSA4 and P_MSA5 may be set to 00h.

Referring to FIG. 23C, in this example, the BD-R only part 2300 of the (T)DDS format 2240 for TL/QL includes an inconsistency flags for SBM field 2311 (4 bits), a size of TDMA in ISA field 2312, a size of TDMA in RMSA field 2333, a size of TDMA in LMSA field 2334, a size of TDMA in OSA field 2335, a reserved bits field, a P_TZ0, P_TZ1 field 2336, a P_TZ2, P_TZ3 field 2337, a reserved bits field, a P__1sTDFL-P__8thTDMA field 2338, a P__9sTDFL-P__16thTDMA field 2339, a P_SRRI/P_SBM0 field 2340, a PSBM1 field 2341, a P_SBM2, PSBM3 field 2342, a P_ISA, P_MSA0, P_MSA1, P_MSAOPC2 field 2343, and a P_MSA3, P_MSA4, P_MSA5, P_OSA field 2344.

FIG. 23C is similar to FIG. 23B except that a field is added to separately define the size of TDMA in RMSA field 2333 and the size of TDMA in LMSA field 2334. That is, although TDMAs in all MSAs have the same size and thus are represented using one field in FIG. 23B, in FIG. 23C, flexibility is provided in allocating TDMAs by allocating TDMAs in RMSAs toward an outer circumference of a disc and TDMAs in LMSAs toward an inner circumference of the disc to have different sizes, instead of allocating TDMAs in all MSAs to have the same size.

All bytes of information fields related to a QL disc, which are not applied to a TL disc, are set to 00h in the TL disc.

An example of a TDFL format is described herein.

In a TDFL format, because a maximum size of the TDFL format is increased due to a high-density/multilayer structure, the TDFL format having a changed size may be recognized using, for example, a method of changing a format version.

Figure 24A:
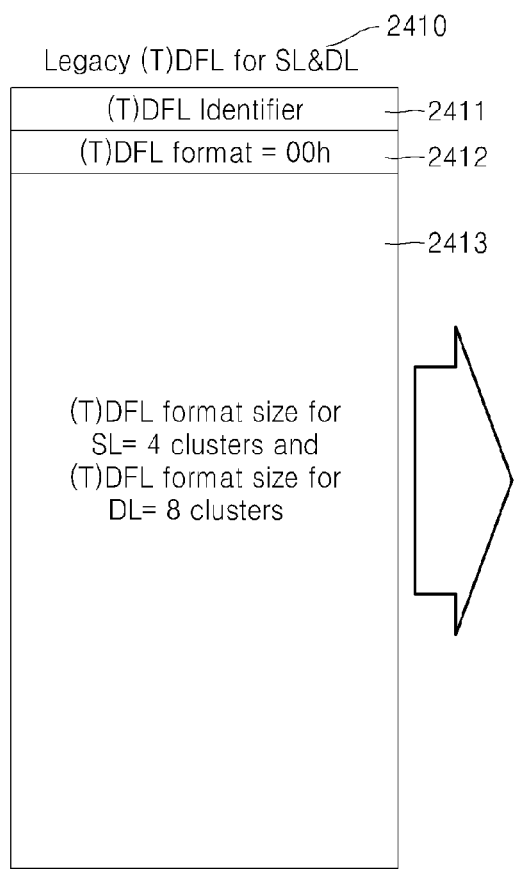
FIGS. 24A and 24B are diagrams illustrating examples of a legacy TDFL format and a proposed TDFL format, respectively.

Referring to FIG. 24A, in this example, a legacy (T)DFL format 2410 for SL/DL includes a (T)DFL identifier field 2411 for identifying a (T)DFL, and a (T)DFL format number field 2412 set to 00, and a (T)DFL format size field 2413 represents 4 clusters for an SL disc and 8 clusters for a DL disc.

Figure 24B:
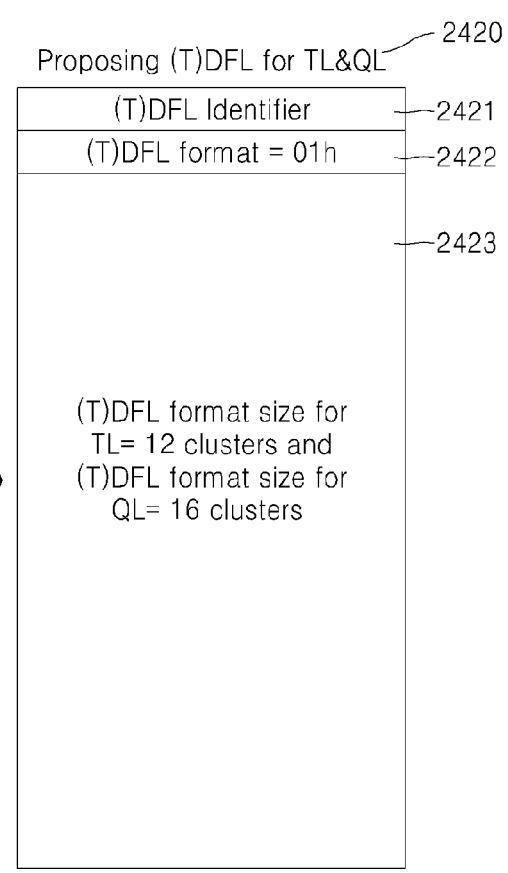

Referring to FIG. 24B, in this example, a proposed (T)DFL format 2420 for TL/QL includes a (T)DFL identifier field 2421 for identifying a (T)DFL, and a (T)DFL format number field 2422 set to 01. The (T)DFL format number field 2422 is set to 01h to identify an SL/DL (T)DFL format and a TL/QL (T)DFL format from each other. A (T)DFL format size field 2423 represents 12 clusters for a TL disc and 16 clusters for a QL disc.

An example of a SBM format is described herein.

In an SBM format, because an SBM is formed for each layer, the SBM format includes a layer number representing a layer corresponding to the SBM. Due to an increase in the number of layers, the above information is expanded. Also, when a physical section of an area representing a bitmap is represented using an address (a PSN), because a start and end of the address may change due to a high-density structure, a corresponding field has to be redefined. As such, a SBM has to be recognized using, for example, a method of changing a format version (i.e., a format number).

An example of a PAC format is described herein.

In a PAC format, because information representing whether each area (including a reserved area of a lead-in area) allocated to a disc is recordable/reproducible is included, due to a high-density/multilayer structure, if the sizes, locations, and uses of areas allocated to a disc are added/changed, information fields have to be added/changed or redefined.

Figure 25A:
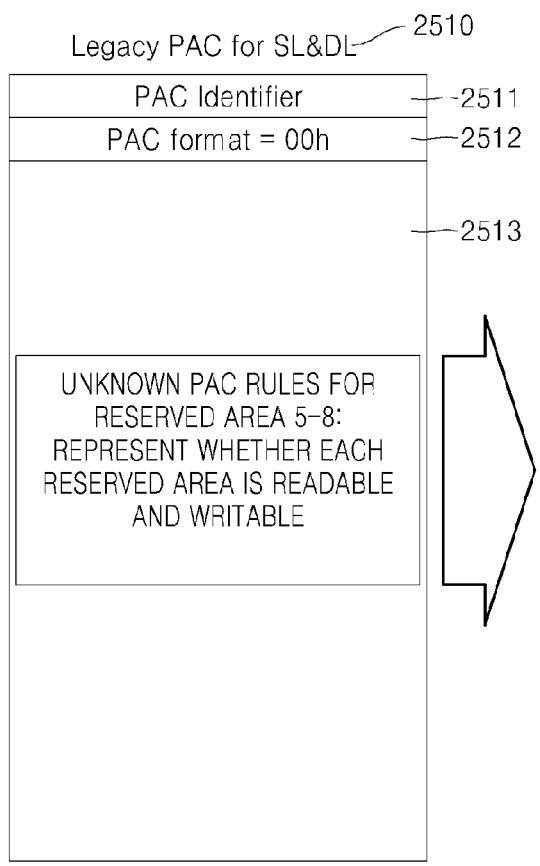
FIGS. 25A and 25B are diagrams illustrating examples of a legacy physical access control (PAC) format and a proposed PAC format, respectively.

Referring to FIG. 25A, in this example, a legacy PAC format 2510 for SL/DL includes a PAC identifier field 2511 for identifying a PAC area, and a PAC format number field 2512 set to 00.

Figure 25B:
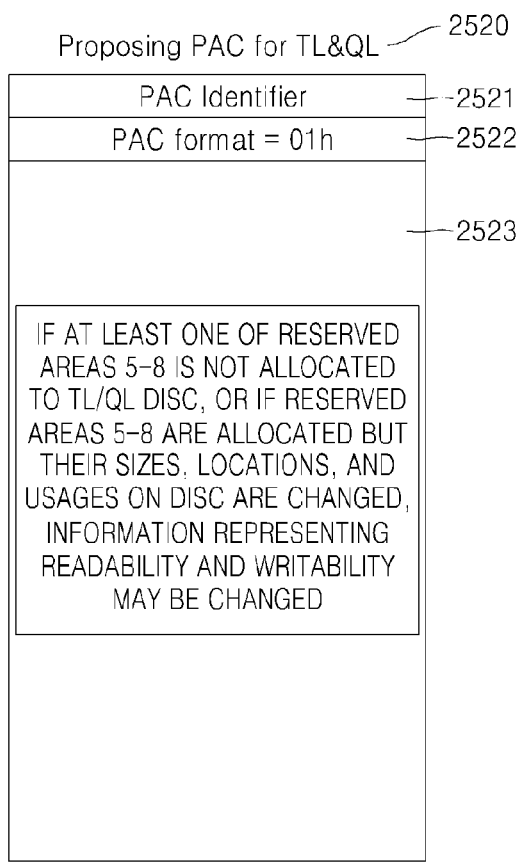

Referring to FIG. 25B, in this example, a proposed PAC format 2520 for TL/QL includes a PAC identifier field 2521 for identifying a PAC area, and a PAC format number field 2522 set to 01. Due to an addition of recording layers, in the proposed PAC format 2520 for TL/QL, the PAC format number field 2522 is set to 01h to identify a SL/DL PAC format and a TL/QL PAC format from each other.

In a legacy PAC format, because information representing whether each reserved area aligned on a lead-in area is readable and writable (unknown PAC rules for reserved areas 5 to 8) is included, due to an addition of recording layers, if at least one of the reserved areas 5 to 8 is not allocated to a TL/QL disc, or if the reserved areas 5 to 8 are allocated but their sizes, locations, and usages on the disc change, the information representing readability and writability may change. Accordingly, in order to define that field information of a TL/QL PAC format is different from that of a legacy PAC format, a TL/QL PAC format number may be defined as a new number different from a legacy SL/DL PAC format number.

In DDS and DFL formats, because a final TDDS and TDFL are respectively converted into a DDS and DFL before being recorded when a disc is finalized, the DDS and DFL formats depend on a change of a format version and an addition/change and a redefinition of information fields in TDDS and TDFL formats due to a high-density/multilayer structure.

Figure 26:
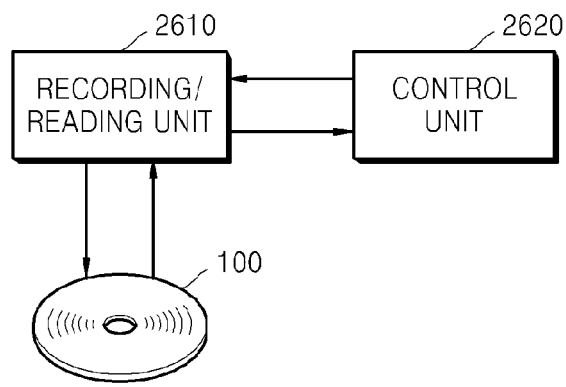
FIG. 26 is a diagram illustrating an example of a recording/reproducing apparatus.

FIG. 26 illustrates an example of a recording/reproducing apparatus.

Referring to FIG. 26, the recording/reproducing apparatus includes a recording/reading unit 2610 and a control unit 2620.

The recording/reading unit 2610 may record data on and may read data from an information storage medium such as recording medium 100, by the control of the control unit 2620.

The control unit 2620 may control the recording/reading unit 2610 to record or read data on or from the recording medium 100. In a recording process, data is recorded on the recording medium 100 or test recording is performed on an OPC area. In a reproducing process, data is read from the recording medium 100. Also, if a defect is detected while recording data on a data zone of the recording medium 100, information about the defect may be recorded on a TDMA of the recording medium 100.

A recording apparatus and a reproducing apparatus may be a separate apparatuses or one system as illustrated in FIG. 26.

Figure 27:
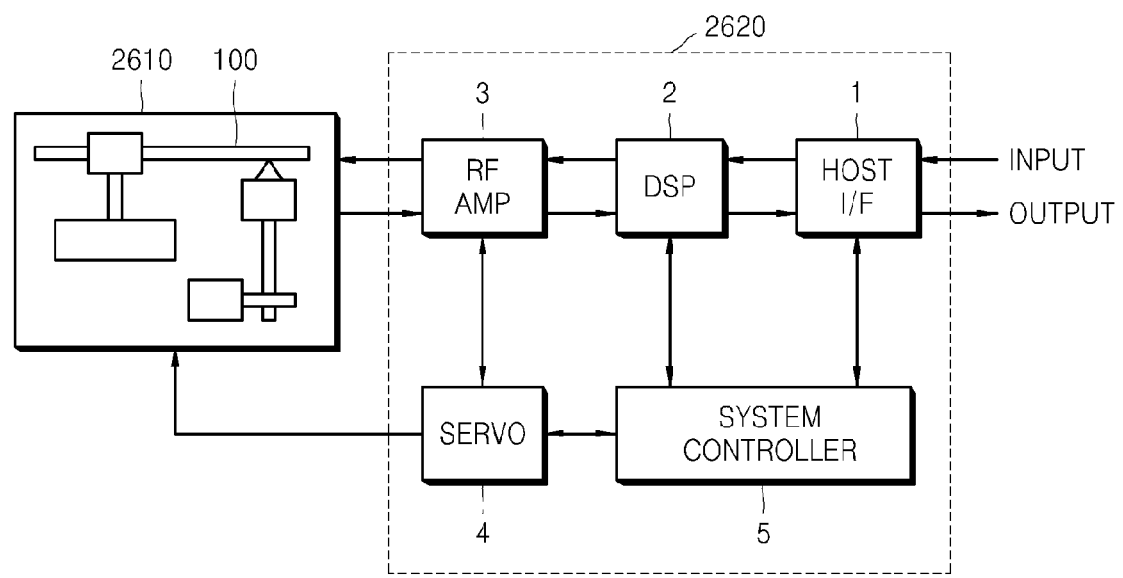
FIG. 27 is a diagram illustrating an example of a drive including the recording/reproducing apparatus illustrated in FIG. 26.

FIG. 27 illustrates an example of a drive including the recording/reading unit 2610 illustrated in FIG. 26.

Referring to FIG. 27, the drive includes a pickup as the recording/reading unit 2610 and a control unit 2620. In this example, the recording medium 100 is mounted on the pickup 2610. The control unit 2620 includes a host interface (I/F) 1, a digital signal processor (DSP) 2, a radio frequency (RF) amplifier (AMP) 3, a servo 4, and a system controller 5, as the control unit 2620.

In a recording process, the host I/F 1 may receive data to be recorded and a recording command from a host (not shown). The system controller 5 may perform an initialization process to record the data. The DSP 2 may perform error correction (ECC) encoding on the data received from the host I/F 1 by adding auxiliary data such as parity bits. The DSP 2 may modulate the ECC encoded data using a predetermined method. The RF AMP 3 may transform the data output from the DSP 2, into an RF signal. The pickup 2610 may record the RF signal output from the RF AMP 3, on the recording medium 100. The servo 4 may receive a command for servo control from the system controller 5 and servo 4 may control the pickup 2610.

As an example, the system controller 5 may transmit data related to a recording medium on which OPC areas and TDMA areas are aligned, i.e., an information storage medium in which at least one of a plurality of recording layers includes a TDMA for recording information about a defect detected in a data zone, in an inner circumference zone. In this example, the size of a TDMA aligned on an upper layer may be greater than the size of a TDMA aligned on a lower layer. The system controller 5 may control the pickup 2610 to record the information about the defect on the TDMA.

In a reproducing process, the host I/F 1 may receive a reproducing command from a host (not shown). The system controller 5 may perform an initialization process to reproduce data. The pickup 2610 may output an optical signal obtained by radiating a laser beam to the recording medium 100 and receiving the laser beam reflected on the recording medium 100. The RF AMP 3 may transform the optical signal output from the pickup 2610, into an RF signal, provide modulated data obtained from the RF signal, to the DSP 2, and provide a servo signal for control, which is obtained from the RF signal, to the servo 4. The DSP 2 may demodulate the modulated data, perform ECC encoding on the demodulated data, and output the ECC-encoded data. Meanwhile, the servo 4 may receive the servo signal from the RF AMP 3, receive a command for servo control from the system controller 5, and control the pickup 2610. The host I/F 1 may transmit the data received from the DSP 2, to the host.

As an example, the system controller 5 may transmit data related to a recording medium on which OPC areas and TDMA areas are aligned, i.e., an information storage medium in which at least one of a plurality of recording layers includes a TDMA for recording information about a defect detected in a data zone, in an inner circumference zone. In this example, the size of a TDMA aligned on an upper layer may be greater than the size of a TDMA aligned on a lower layer. The system controller 5 may control the pickup 2610 to read the information about the defect from the TDMA.

Also, the system controller 5 may record and reproduce data on or from a disc, of which an information format is newly defined using the above-described method, according to the newly defined information format. According to an embodiment, information fields to be added/changed due to a high-density/multilayer structure of an information storage medium may be added/changed, and a format version number of an information format may be set differently from that of a legacy information format. Also, according to an embodiment, if information fields of a legacy information format are added/changed due to a high-density/multilayer structure of an information storage medium, the information fields may be redefined in such a way that the meanings of the information fields are interpretable.

Figure 28:
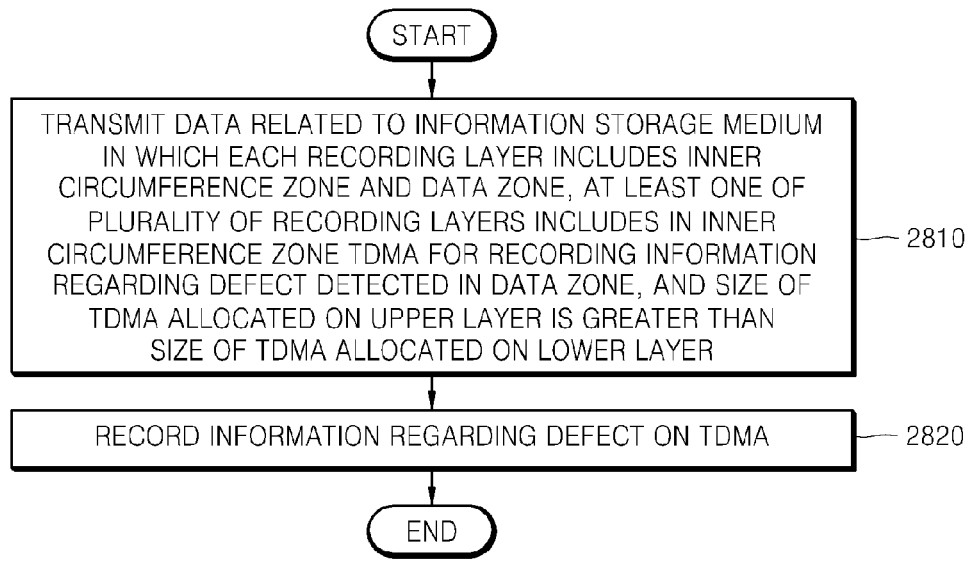
FIG. 28 is a flowchart illustrating an example of a recording method.

FIG. 28 illustrates an example of a recording method.

Referring to FIG. 28, data related to an information storage medium, in which each recording layer includes an inner circumference zone and a data zone, at least one of a plurality of recording layers includes in the inner circumference zone a TDMA for recording information about a defect detected in the data zone, and the size of the TDMA aligned on an upper layer is greater than the size of the TDMA aligned on a lower layer, is transmitted (2810), and the information about the defect is recorded on the TDMA (2820).

Figure 29:
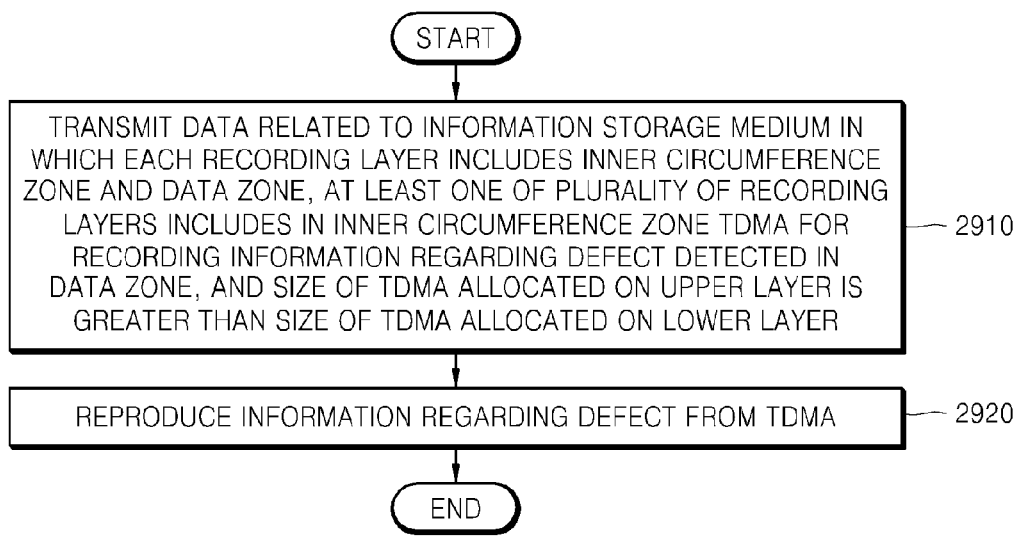
FIG. 29 is a flowchart illustrating an example of a reproducing method.

FIG. 29 illustrates an example of a reproducing method.

Referring to FIG. 29, data related to an information storage medium, in which each recording layer includes an inner circumference zone and a data zone, at least one of a plurality of recording layers includes in the inner circumference zone a TDMA for recording information about a defect detected in the data zone, and the size of the TDMA aligned on an upper layer is greater than the size of the TDMA aligned on a lower layer, is transmitted (2910), and the information about the defect is reproduced from the TDMA (2920).

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An information storage medium comprising:
   at least three recording layers,
   wherein each recording layer comprises an inner circumference zone and a data zone,
   each of the at least three recording layers comprises a temporary disc management area (TDMA), in the inner circumference zone, for recording information about a defect that is detected in the data zone,
   the at least three recording layers comprise a first recording layer which is arranged nearest to a pickup, a third recording layer which is arranged farthest from the pickup, and a second recording layer that is arranged between the first recording layer and the third recording layer, and
   a size of a TDMA allocated on the inner circumference zone of the first recording layer is smaller than a size of a TDMA allocated on the inner circumference zone of the second recording layer, and the size of the TDMA allocated on the inner circumference zone of the second recording layer is smaller than a size of a TDMA allocated on the inner circumference zone of the third recording layer.

2. The information storage medium of claim 1, wherein information about the size of the TDMA is recorded in a temporary disc definition structure (TDDS).

3. An apparatus for recording data on an information storage medium including at least three recording layers, each recording layer including an inner circumference zone and a data zone, and each recording layer including, in the inner circumference zone, a temporary disc management area (TDMA) for recording information about a defect detected in the data zone, the apparatus comprising:
   a pickup configured to transmit data related to the information storage medium; and
   a control unit configured to control the pickup to record the information about the defect detected in the data zone on the TDMA of at least one recording layer,
   wherein the control unit controls the pickup to detect defect information from the at least three recording layers which comprise a first recording layer which is arranged nearest to a pickup, a third recording layer which is arranged farthest from the pickup, and a second recording layer that is arranged between the first recording layer and the third recording layer, and
   the control unit controls the pickup to record information about a detected defect in a TDMA of at least one of the at least three recording layers in which the defect is detected based on a size of the TDMA, wherein a size of a TDMA allocated on the inner circumference zone of the first recording layer is smaller than a size of a TDMA allocated on the inner circumference zone of the second recording layer, and the size of the TDMA allocated on the inner circumference zone of the second recording layer is smaller than a size of a TDMA allocated on the inner circumference zone of the third recording layer.

4. The apparatus of claim 3, wherein information about the size of the TDMA is recorded on a temporary disc definition structure (TDDS).

5. An apparatus for reproducing data from an information storage medium including at least three recording layers, each recording layer including an inner circumference zone and a data zone, and each recording layer including, in the inner circumference zone, a temporary disc management area (TDMA) for recording information about a defect detected in the data zone, the apparatus comprising:
- a pickup configured to transmit data related to the information storage medium; and
- a control unit configured to control the pickup to read the information about the defect from the TDMA of at least one recording layer,
- wherein the control unit controls the pickup to read defect information from a TDMA of the at least three recording layers based on a size of the TDMA, and the at least three recording layers comprise a first recording layer which is arranged nearest to a pickup, a third recording layer which is arranged farthest from the pickup, and a second recording layer that is arranged between the first recording layer and the third recording layer, and
- a size of a TDMA allocated on the inner circumference zone of the first recording layer is smaller than a size of a TDMA allocated on the inner circumference zone of the second recording layer is smaller than a size of a TDMA allocated on the inner circumference zone of the third recording layer.

6. The apparatus of claim 5, wherein information about the size of the TDMA is recorded on a temporary disc definition structure (TDDS).

7. A method of recording data on an information storage medium including at least three recording layers, each recording layer including an inner circumference zone and a data zone, and each recording layer including, in the inner circumference zone, a temporary disc management area (TDMA) for recording information about a defect detected in the data zone, the method comprising:
- transmitting data related to the information storage medium; and
- recording the information about the defect on the TDMA of at least one recording layer,
- wherein the transmitting comprises detecting defect information from the at least three recording layers which comprise a first recording layer which is arranged nearest to a pickup, a third recording layer which is arranged farthest from the pickup, and a second recording layer that is arranged between the first recording layer and the third recording layer, and
- the recording comprises recording information about a detected defect in a TDMA of at least one of the at least three recording layers in which the defect is detected based on a size of the TDMA, wherein a size of a TDMA allocated on the inner circumference zone of the first recording layer is smaller than a size of a TDMA allocated on the inner circumference zone of the second recording layer, and the size of the TDMA allocated on the inner circumference zone of the second recording layer is smaller than a size of a TDMA allocated on the inner circumference zone of the third recording layer.

8. The method of claim 7, wherein information about the size of the TDMA is recorded on a temporary disc definition structure (TDDS).

9. A method of reproducing data from an information storage medium including at least three recording layers, each recording layer including an inner circumference zone and a data zone, and each recording layer including, in the inner circumference zone, a temporary disc management area (TDMA) for recording information about a defect detected in the data zone, the method comprising:
- transmitting data related to the information storage medium; and
- reproducing the information about the defect from the TDMA of at least one recording layer,
- wherein the transmitting comprises reading defect information from a TDMA of the at least three recording layers based on a size of the TDMA, and the at least three recording layers comprise a first recording layer which is arranged nearest to a pickup, a third recording layer which is arranged farthest from the pickup, and a second recording layer that is arranged between the first recording layer and the third recording layer, and
- a size of a TDMA allocated on the inner circumference zone of the first recording layer is smaller than a size of a TDMA allocated on the inner circumference zone of the second recording layer, and the size of the TDMA allocated on the inner circumference zone of the second recording layer is smaller than a size of a TDMA allocated on the inner circumference zone of the third recording layer.

10. The method of claim 9, wherein information about the size of the TDMA is recorded on a temporary disc definition structure (TDDS).

* * * * *